US011308495B2

(12) United States Patent
Lu et al.

(10) Patent No.: US 11,308,495 B2
(45) Date of Patent: Apr. 19, 2022

(54) FINANCIAL CARD WITH FUNCTION OF FINGERPRINT VERIFICATION AND WORKING METHOD THEREFOR

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 43 days.

(21) Appl. No.: 16/803,949

(22) Filed: Feb. 27, 2020

(65) Prior Publication Data
US 2020/0202360 A1    Jun. 25, 2020

Related U.S. Application Data

(63) Continuation of application No. PCT/CN2018/112122, filed on Oct. 26, 2018.

(30) Foreign Application Priority Data

Dec. 11, 2017    (CN) .......................... 201711306207.1

(51) Int. Cl.
     *G06Q 20/40*       (2012.01)
     *G06K 19/07*       (2006.01)
     *G06Q 20/34*       (2012.01)

(52) U.S. Cl.
     CPC ... *G06Q 20/40145* (2013.01); *G06K 19/0718* (2013.01); *G06Q 20/341* (2013.01);
     (Continued)

(58) Field of Classification Search
     CPC .......... G06Q 20/40145; G06Q 20/341; G06Q 20/354; G06Q 20/3563; G06Q 20/3574; G06K 19/0718
     (Continued)

(56) References Cited

U.S. PATENT DOCUMENTS

| 6,182,892 B1 * | 2/2001 | Angelo .............. G06K 9/00046 235/380 |
| 6,219,439 B1 * | 4/2001 | Burger .................... G06F 21/34 382/115 |

(Continued)

FOREIGN PATENT DOCUMENTS

| AU | 2005307724 A2 * | 5/2006 | ......... H04L 63/0861 |
| CN | 1259712 A * | 7/2000 | |

(Continued)

OTHER PUBLICATIONS

"Fingerprint security for protecting EMV payment cards," by Himanshu Vats; Ron Ruhl; and Shaun Aghili. 2015 10th International Conference for Internet Technology and Secured Transactions (ICITST). pp. 95-101. (Year: 2015).*

(Continued)

*Primary Examiner* — Sara C Hamilton
(74) *Attorney, Agent, or Firm* — J.C. Patents

(57) ABSTRACT

The present disclosure provides a financial card with function of fingerprint verification and a working method therefor, which belongs to information technology field The financial card with function of fingerprint verification includes: a waiting and receiving module (401), a determining module (402), a storing module (403), a first sending module (404), a second sending module (405), a third sending module (406), an application cryptogram module (407) and a fourth sending module (408). The financial card provided by the present disclosure further includes a cardholder verifying module and/or a boot-up verifying module The solution provided by the present disclosure improves security of the identity verification in an e-transaction and makes the e-transaction to be more convenient by using the fingerprint to execute identity verification.

7 Claims, 8 Drawing Sheets

US 11,308,495 B2

Page 2

(52) U.S. Cl.
CPC ....... *G06Q 20/354* (2013.01); *G06Q 20/3563* (2013.01); *G06Q 20/3574* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 6,775,398 B1* | 8/2004 | Schaeck | ............... | G06Q 20/341 382/124 |
| 7,793,845 B2* | 9/2010 | Bonalle | ............... | G06Q 20/382 235/487 |
| 7,819,322 B2* | 10/2010 | Hammad | ............... | G06Q 40/00 235/449 |
| 9,519,901 B1* | 12/2016 | Dorogusker | ......... | G06Q 20/202 |
| 9,600,808 B1* | 3/2017 | Gomez, Sr. | ............ | H04M 17/30 |
| 10,496,808 B2* | 12/2019 | Van Os | ............ | G06Q 20/40145 |
| 10,817,878 B2* | 10/2020 | Rans | ................ | G06Q 20/341 |
| 2001/0040987 A1* | 11/2001 | Bjorn | ................ | G07F 7/1008 382/124 |
| 2001/0048025 A1* | 12/2001 | Shinn | ................ | G07C 9/257 235/382 |
| 2002/0018585 A1* | 2/2002 | Kim | ................ | G07C 9/257 382/125 |
| 2002/0062284 A1* | 5/2002 | Kawan | ................ | G06Q 20/40145 705/43 |
| 2002/0087869 A1* | 7/2002 | Kim | ................ | G07C 9/257 713/186 |
| 2002/0095587 A1* | 7/2002 | Doyle | ................ | G07F 7/1008 713/186 |
| 2003/0074317 A1* | 4/2003 | Hoti | ................ | G06Q 20/40 705/44 |
| 2003/0200180 A1 | 10/2003 | Phelan, III et al. | | |
| 2004/0085188 A1* | 5/2004 | Minemura | ........... | G06Q 20/322 340/5.53 |
| 2004/0133787 A1* | 7/2004 | Doughty | ............ | G06Q 20/4014 713/186 |
| 2004/0232220 A1* | 11/2004 | Beenau | ................ | G06Q 20/341 235/380 |
| 2004/0232224 A1* | 11/2004 | Beenau | ................ | G06Q 20/40145 235/380 |
| 2004/0236701 A1* | 11/2004 | Beenau | ................ | G06Q 20/32 705/64 |
| 2004/0238621 A1* | 12/2004 | Beenau | ................ | G06Q 20/3278 235/380 |
| 2005/0137977 A1* | 6/2005 | Wankmueller | ....... | G06Q 20/102 705/40 |
| 2005/0194452 A1* | 9/2005 | Nordentoft | ...... | G06Q 20/40145 235/492 |
| 2005/0212657 A1* | 9/2005 | Simon | ................ | G06F 21/32 340/5.74 |
| 2006/0000891 A1* | 1/2006 | Bonalle | ................ | G07C 9/27 235/380 |
| 2006/0000892 A1* | 1/2006 | Bonalle | ............... | G06Q 20/40145 235/380 |
| 2006/0000894 A1* | 1/2006 | Bonalle | ............. | G06K 19/0718 235/380 |
| 2006/0016870 A1* | 1/2006 | Bonalle | ................ | G06Q 20/341 235/380 |
| 2006/0016871 A1* | 1/2006 | Bonalle | ................ | G06Q 20/40145 235/380 |
| 2006/0016874 A1* | 1/2006 | Bonalle | ................ | G07F 7/1008 235/380 |
| 2006/0016875 A1* | 1/2006 | Bonalle | ................ | G07C 9/257 235/380 |
| 2006/0016876 A1* | 1/2006 | Bonalle | ................ | G07F 7/1008 235/380 |
| 2006/0016877 A1* | 1/2006 | Bonalle | ................ | G07C 9/27 235/380 |
| 2006/0020558 A1* | 1/2006 | Bonalle | ................ | G07F 7/1008 705/64 |
| 2006/0047971 A1* | 3/2006 | Miyazaki | ............ | G06K 9/0002 713/186 |
| 2006/0174134 A1* | 8/2006 | Taylor | .................. | G06Q 20/341 713/186 |
| 2006/0190737 A1* | 8/2006 | Miyasaka | ........... | G06Q 20/341 713/185 |
| 2007/0073619 A1* | 3/2007 | Smith | .................... | G07C 9/257 705/41 |
| 2007/0092112 A1* | 4/2007 | Awatsu | ................ | G06Q 20/346 382/115 |
| 2007/0145121 A1* | 6/2007 | Dallal | .................. | G07F 7/0886 235/380 |
| 2007/0220273 A1* | 9/2007 | Campisi | ............. | G06Q 20/3574 713/186 |
| 2007/0228154 A1* | 10/2007 | Tran | .................... | G06K 19/0718 235/380 |
| 2008/0056544 A1* | 3/2008 | Aikawa | ............. | G06K 9/00885 382/124 |
| 2008/0282540 A1* | 11/2008 | Singleton | .......... | B29C 45/14647 29/856 |
| 2009/0153297 A1* | 6/2009 | Gardner | ........... | G06K 19/07732 340/5.83 |
| 2009/0307139 A1* | 12/2009 | Mardikar | ........... | G06Q 20/382 705/67 |
| 2010/0008535 A1 | 1/2010 | Abulafia et al. | | |
| 2010/0030696 A1* | 2/2010 | Naccache | ............ | G06F 21/305 705/71 |
| 2010/0038418 A1* | 2/2010 | Fomitchev | ............. | G06Q 40/02 235/379 |
| 2010/0051688 A1* | 3/2010 | Imaizumi | ......... | G06Q 20/40145 235/380 |
| 2010/0245037 A1* | 9/2010 | Davis | ............... | G06Q 20/40145 340/5.53 |
| 2011/0079646 A1* | 4/2011 | Lin | .................... | G06K 19/0717 235/382 |
| 2013/0036017 A1* | 2/2013 | Galloway | .......... | G06Q 20/105 705/16 |
| 2013/0036480 A1* | 2/2013 | Anderson | ............... | G06F 21/77 726/30 |
| 2013/0056539 A1* | 3/2013 | Iwaloye | .......... | G06K 19/07354 235/492 |
| 2013/0207786 A1* | 8/2013 | Hutzler | .............. | G06K 19/0718 340/10.51 |
| 2014/0025520 A1* | 1/2014 | Mardikar | ........... | G06Q 20/3821 705/21 |
| 2015/0035643 A1* | 2/2015 | Kursun | ............... | H04W 12/065 340/5.52 |
| 2015/0100485 A1* | 4/2015 | Skliar | ............... | G06Q 20/40145 705/41 |
| 2015/0127550 A1* | 5/2015 | Khan | ................... | G06Q 20/382 705/71 |
| 2015/0348000 A1* | 12/2015 | Khan | ................... | G06Q 20/322 705/41 |
| 2016/0042356 A1* | 2/2016 | Jakobson | ............ | G06Q 20/321 705/21 |
| 2016/0125415 A1* | 5/2016 | Mardikar | ........... | G06K 9/00013 705/44 |
| 2016/0132865 A1* | 5/2016 | Park | ................... | G06Q 20/3278 705/39 |
| 2016/0203478 A1* | 7/2016 | Gardiner | ............ | G06Q 20/382 705/16 |
| 2016/0203481 A1* | 7/2016 | Gardiner | .......... | G06Q 20/40145 705/18 |
| 2016/0203492 A1* | 7/2016 | Gardiner | ............ | G06Q 20/401 705/16 |
| 2016/0217312 A1* | 7/2016 | Gardiner | ............ | G06Q 20/409 |
| 2016/0253669 A1* | 9/2016 | Yoon | ............... | G06Q 20/327 705/75 |
| 2016/0267486 A1* | 9/2016 | Mitra | .................. | H04W 12/041 |
| 2017/0169434 A1* | 6/2017 | Maddocks | ............ | G06F 21/32 |
| 2017/0186015 A1* | 6/2017 | Jin | ....................... | G06Q 20/321 |
| 2017/0200163 A1* | 7/2017 | Davenport | .......... | G06Q 20/4012 |
| 2017/0228631 A1* | 8/2017 | Larsen | ............. | G06K 19/0719 |
| 2017/0286789 A1* | 10/2017 | Wintergerst Lavin | ...... | G06K 9/00912 |
| 2017/0323166 A1* | 11/2017 | Colussi | ............. | G06K 9/00335 |

(56) References Cited

U.S. PATENT DOCUMENTS

| | | | |
|---|---|---|---|
| 2017/0330170 A1* | 11/2017 | Cho | H04B 5/0031 |
| 2018/0004927 A1* | 1/2018 | Lowe | G06F 21/34 |
| 2018/0032712 A1* | 2/2018 | Oh | H04L 9/3231 |
| 2018/0033013 A1* | 2/2018 | Park | G06Q 20/325 |
| 2018/0189767 A1* | 7/2018 | Bigioi | G06Q 20/204 |
| 2018/0204102 A1* | 7/2018 | Noach | G06K 19/0772 |
| 2018/0211022 A1* | 7/2018 | Wagner | G06F 21/32 |
| 2018/0260816 A1* | 9/2018 | Yuan | G06Q 20/32 |
| 2019/0012672 A1* | 1/2019 | Francesco | G06Q 20/4016 |
| 2019/0065918 A1* | 2/2019 | Humborstad | G06K 19/0718 |
| 2019/0147684 A1* | 5/2019 | Tanaka | G06Q 20/40145 235/380 |
| 2019/0340398 A1* | 11/2019 | Mosteller | G06Q 20/40145 |
| 2020/0302428 A1* | 9/2020 | Sambhar | G06Q 20/40145 |
| 2020/0410500 A1* | 12/2020 | Dorogusker | G06Q 20/401 |

FOREIGN PATENT DOCUMENTS

| | | | | |
|---|---|---|---|---|
| CN | 1553404 | A | | 12/2004 |
| CN | 101485128 | A | * | 7/2009 |
| CN | 101596820 | A | | 12/2009 |
| CN | 102081821 | A | | 6/2011 |
| CN | 102467775 | A | | 5/2012 |
| CN | 104539430 | A | | 4/2015 |
| CN | 104574070 | A | | 4/2015 |
| CN | 205247428 | U | * | 5/2016 |
| CN | 205302348 | U | * | 6/2016 |
| CN | 105959287 | A | | 9/2016 |
| CN | 106203593 | A | | 12/2016 |
| CN | 106355404 | A | | 1/2017 |
| CN | 106600825 | A | | 4/2017 |
| CN | 206097155 | U | | 4/2017 |
| CN | 106845993 | A | | 6/2017 |
| CN | 107665426 | A | * | 2/2018 | G06Q 20/327 |
| CN | 108038694 | A | | 5/2018 |
| DE | 102005015180 | A1 | * | 10/2006 | G06K 9/00087 |
| EP | 1679666 | A2 | * | 7/2006 | G07C 9/257 |
| EP | 3118790 | A1 | * | 1/2017 | G06Q 20/02 |
| EP | 3179431 | A1 | * | 6/2017 | G06Q 20/40 |
| GB | 2513712 | A | * | 11/2014 | G06Q 20/405 |
| GB | 2555817 | A | * | 5/2018 | H04L 63/0861 |
| JP | H11328295 | A | * | 11/1999 |
| JP | 2003123032 | A | | 4/2003 |
| JP | 2006065455 | A | * | 3/2006 | G07F 7/1008 |
| JP | 2018508091 | A | * | 3/2018 |
| KR | 20060093263 | A | * | 8/2006 | G06F 21/32 |
| KR | 20070032900 | A | * | 3/2007 | G06Q 20/341 |
| KR | 20070042898 | A | * | 4/2007 |
| KR | 20180006338 | A | * | 1/2018 |
| KR | 20180061819 | A | * | 6/2018 |
| TW | 200805172 | A | * | 1/2008 |
| WO | WO-2005066906 | A1 | * | 7/2005 | G06Q 20/40145 |
| WO | WO-2007143740 | A2 | * | 12/2007 | G06Q 20/18 |
| WO | WO-2013186682 | A1 | * | 12/2013 | G07F 7/122 |
| WO | WO-2016106277 | A2 | * | 6/2016 | G07F 7/0846 |
| WO | WO-2016171295 | A1 | * | 10/2016 | H04L 63/0823 |
| WO | WO-2017019972 | A1 | * | 2/2017 | G06F 21/32 |
| WO | WO-2017027680 | A1 | * | 2/2017 | H04W 12/069 |
| WO | WO-2018027587 | A1 | * | 2/2018 | H04W 12/06 |

OTHER PUBLICATIONS

"Secure Swipe machine with help of biometric security," by Akhilesh Singh; Sweta Singh; and Rakesh Kumar. Published: 2016 International Conference on Electrical, Electronics, and Optimization Techniques (ICEEOT). pp. 1056-1061. (Year: 2016).*

Article No. JR/T 0025.6-2018, "China financial integrated circuit card specifications—Part 6: Debit/credit application terminal specification" People's Bank of China; (Nov. 28, 2018); English Abstract is provided.

The International Search Report of corresponding International application No. PCT/CN2018/112122, dated Jan. 30, 2019.

The Chinese First Examination and Search Report of corresponding Chinese application No. 201711306207.1, dated Jul. 25, 2018.

The Chinese Second Examination and Search Report of corresponding Chinese application No. 201711306207.1, dated Aug. 21, 2018.

The Chinese Allowance to Grant and Search Report of corresponding Chinese application No. 201711306207.1, dated Feb. 20, 2019.

* cited by examiner

```
CONT
FROM
FIG.2B
```

When it is determined that the received command is an application data reading command 205. The financial card sends application data corresponding to the file identification in the application data reading command to the host computer

```
CONT
FROM
FIG.2B
```

When it is determined that the received command is an application cryptogram acquiring command 206. The financial card executes card behavior analysis and generates application cryptogram, sends the application cryptogram to the host computer

FIG. 2C

FINANCIAL CARD WITH FUNCTION OF FINGERPRINT VERIFICATION AND WORKING METHOD THEREFOR

CROSS-REFERENCE TO RELATED APPLICATIONS

This application is a continuation of the International Application No. PCT/CN2018/112122, filed on Oct. 26, 2018, which claims priority to Chinese patent application No. 201711306207.1, filed on Dec. 11, 2017, the contents of the above identified applications are incorporated herein by reference in their entireties.

TECHNICAL FIELD

The disclosure relates to information technology field, more particularly, to a financial card with function of fingerprint verification and a working method therefor.

BACKGROUND

In the prior art, with rapid development of electronic information technology, financial card is widely used in e-transaction in daily life. In order to improve security of e-transaction, identity is required to be verified in a process of e-transaction. At present, the method for verifying identity mostly adopts inputting an identity verification code by a user into a host computer which performs data interaction with the financial card. The host computer can be a transaction end or a smart end, for example, the transaction end is a POS machine.

The method for verifying identity in the prior art has following shortcomings. At the time of verifying identification, the user of the financial card is required to input the identity verification code into the host computer, which has a risk of leaking identity verification code and is an opportunity of illegal identity verification code theft. In real transaction, the user of financial card sometimes forgets identity verification code, which result in terminating transaction; if failing times for permitting the user to input the identity verification code surpasses a preset value, the financial card will be locked. All of those bring bad experience to the user.

SUMMARY

The disclosure provides a financial card with function of fingerprint verification and a working method therefor.

The disclosure provides a working method for a financial card with function of fingerprint verification, which includes:

Step S1, waiting, by the financial card, to receive a command from a host computer;

Step S2, determining, by the financial card, a type of the command upon when the command from the host computer is received, if the financial card determines that the type of the command is an application selecting command, executing Step S3; if the financial card determines that the type of the command is a processing option acquiring command, executing Step S4; if the financial card determines that the type of the command is an application data reading command, executing Step S5; if the financial card determines that the type of the command is an application cryptogram acquiring command, executing Step S6;

Step S3, sending, by the financial card, application information supported by itself to the host computer;

Step S4, sending, by the financial card, file information to the host computer;

Step S5, sending, by the financial card, application data corresponding to a file identification in the application data reading command to the host computer;

Step S6, executing, by the financial card, card behavior analysis and generating application cryptogram, sending the application cryptogram to the host computer;

The method further includes:

if the financial card determines that the type of the received command is a verifying command and the verifying command is specifically a fingerprint verifying command in the Step S2, executing, by the financial card, card holder verification according to a fingerprint of a user and returning information related to the card holder verification to the host computer;

and/or, before the Step S1, the method further includes: if the financial card receives a boot-up event, executing, by the financial card, boot-up verification according to a self-stored user registration fingerprint and a fingerprint input by a user, executing the Step S1 if the verification is successful.

The disclosure provides a financial card with function of fingerprint verification, which includes:

a waiting and receiving module, configured to wait to receive a command from a host computer;

a determining module, configured to determine a type of the command when the command from the host computer is received by the waiting and receiving module;

a storing module, configured to store application information supported by the financial card, to store file information and to store application data;

a first sending module, configured to send the application information supported by the financial card which is stored by the storing module to the host computer when the determining module determines that the command received by the waiting and receiving module is an application selecting command;

a second sending module, configured to send the file information stored by the storing module to the host computer when the determining module determines that the type of the command received by the waiting and receiving module is a processing option acquiring command;

a third sending module, configured to send the application data corresponding to a file identification in an application data reading command which is stored by the storing module to the host computer when the determining module determines that the type of the command received by the waiting and receiving module is the application data reading command;

an application cryptogram generating module, configured to execute card behavior analysis and generate application cryptogram if the determining module determines that the type of the command received by the waiting and receiving module is an application cryptogram acquiring command;

a fourth sending module, configured to send the application cryptogram generated by the application cryptogram generating module to the host computer;

the financial card further includes: a card holder verifying module and/or a boot-up verifying module;

the card holder verifying module is configured to, if the determining module determines that the type of the received command received by the waiting and receiving module is a verifying command and the verifying command is specifically a fingerprint verifying command, execute card holder verification according to a fingerprint of a user and return information related to the card holder verification to the host computer;

the storing module is further configured to store user registration fingerprint;

the boot-up verifying module is configured to, if a boot-up event is received, execute boot-up verification according to the user registration fingerprint stored by the storing module and a fingerprint input by a user;

when the boot-up verifying module is comprised in the financial card, the waiting and receiving module is specifically configured to wait to receive the command from the host computer after the verification executed by the boot-up verifying module is successful.

The present disclosure has the advantages that in a process of e-transaction, the financial card executes card holder verification according to a fingerprint of a user and/or executes boot-up verification according to the fingerprint input by the user when the financial card receives a boot-up event, which does not require the user to input the identity verification code to the transaction end and guarantees that the verification information for the identity verification is not leaked and improves security of identity verification.

Meanwhile, in the present disclosure, identity verification is executed by using fingerprint verifying method, the user of the financial card will not stop transaction if the user forgot identity verification code and the financial card will not be locked as well. In addition, compared with the way that identity verification code is used for verifying, the way that fingerprint is used for verifying makes e-transaction to be more convenient.

BRIEF DESCRIPTION OF THE DRAWINGS

FIGS. 2A-2C is a flow chart of a working method for a financial card with function of fingerprint verification in Embodiment 3 of the present disclosure.

DETAILED DESCRIPTION

Figure 1A:
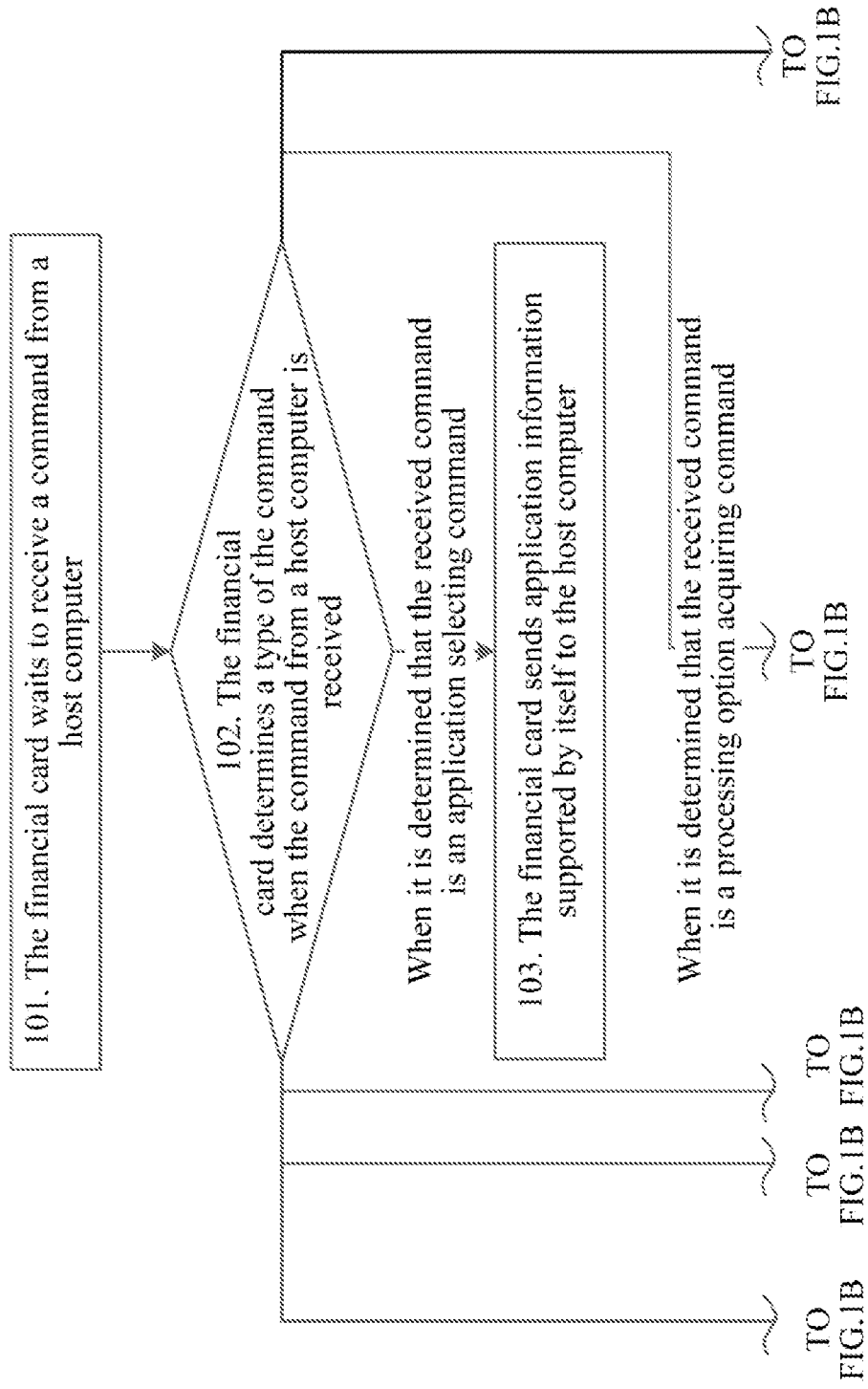
FIGS. 1A-1D is a flow chart of a working method for a financial card with function of fingerprint verification in Embodiment 2 of the present disclosure.
Figure 1B:
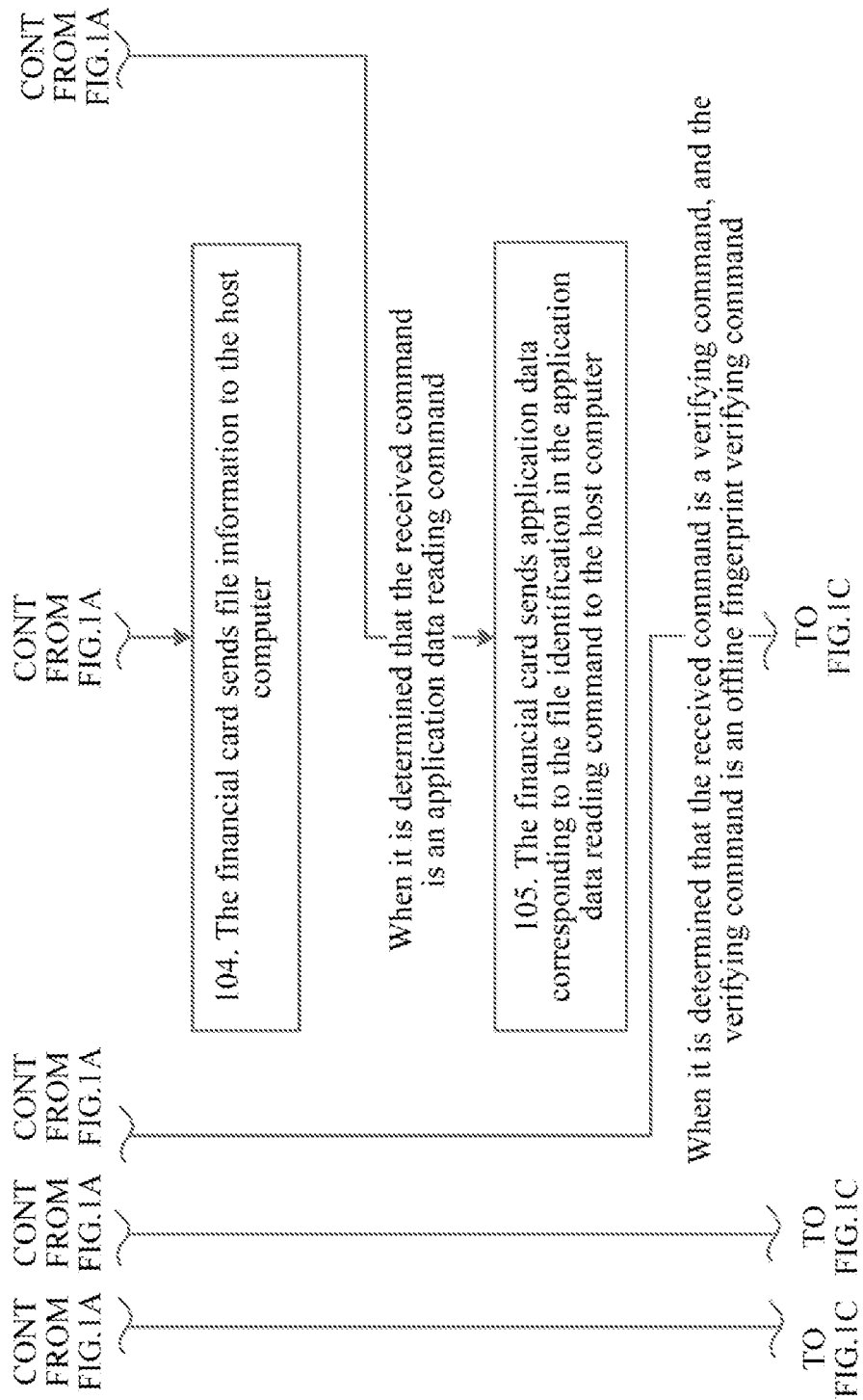
Figure 1C:
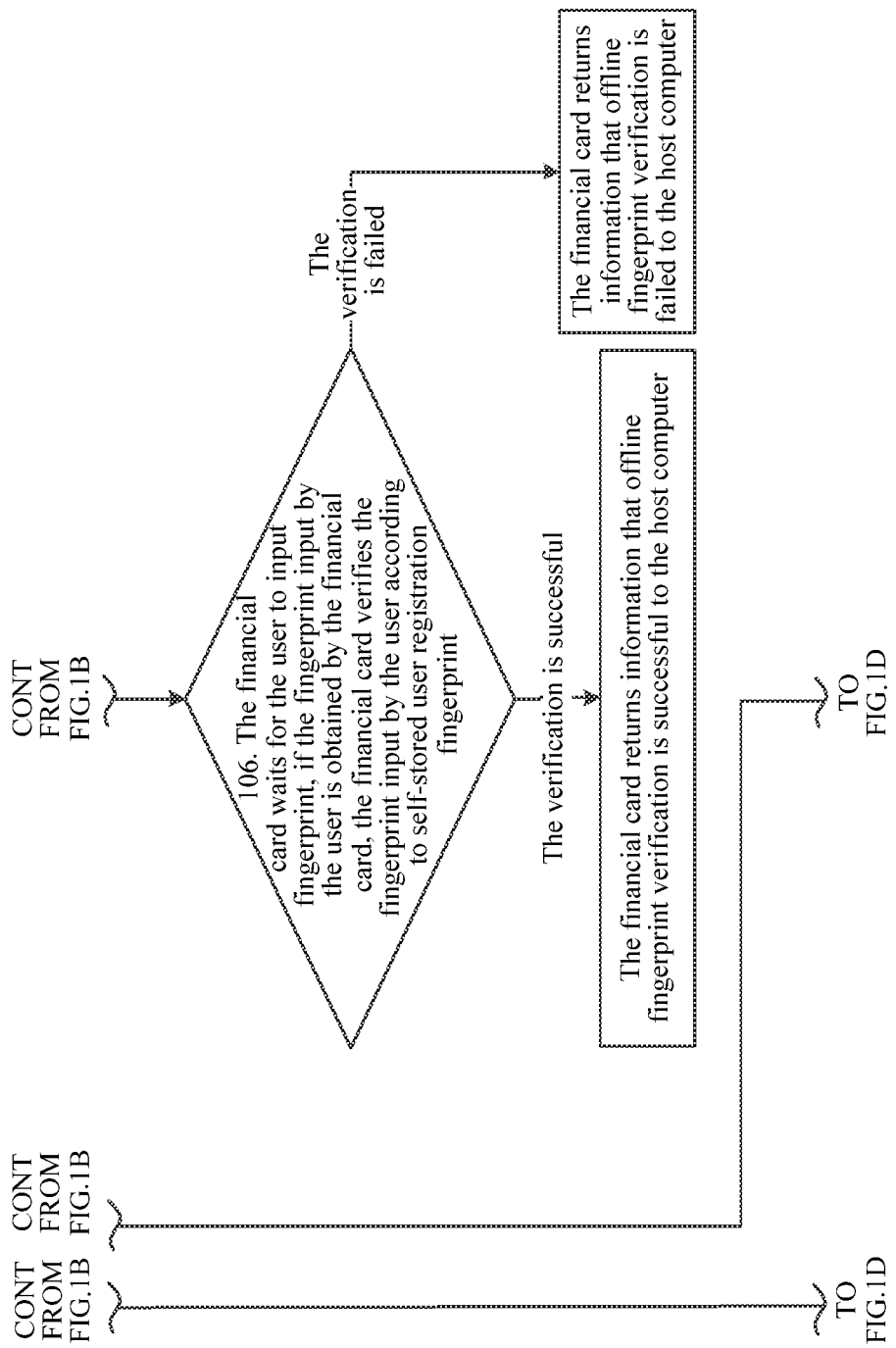
Figure 1D:
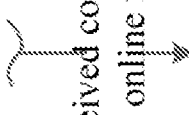
Figure 1D:
Figure 1D:

The technical means of the embodiments of the disclosure are described clearly and completely in conjunction with the accompanying drawings as follows.

Embodiment 1

The present disclosure provides a working method for a financial card with function of fingerprint verification, which includes:

Step S1, the financial card waits to receive a command from a host computer;

Step S2, the financial card determines a type of the command when the command from the host computer is received, if the financial card determines that the type of the command is an application selecting command, executes Step S3; if the financial card determines that the type of the command is a processing option acquiring command, executes Step S4; if the financial card determines that the type of the command is an application data reading command, executes Step S5; if the financial card determines that the type of the command is an application cryptogram acquiring command, executes Step S6;

Step S3, the financial card sends application information supported by itself to the host computer;

Step S4, the financial card sends file information to the host computer;

Step S5, the financial card sends application data corresponding to a file identification in the application data reading command to the host computer;

Step S6, the financial card executes card behavior analysis and generates application cryptogram, sends the application cryptogram to the host computer;

The method further includes:

if the financial card determines that the type of the received command is a verifying command and the verifying command is specifically a fingerprint verifying command in Step S2, the financial card executes card holder verification according to a fingerprint of a user and returns information related to the card holder verification to the host computer;

and/or, before the Step S1, the method further includes: if the financial card receives a boot-up event, the financial card executes boot-up verification according to a self-stored user registration fingerprint and a fingerprint input by a user, executes the Step S1 if the verification is successful.

In the present disclosure, if the fingerprint verifying command is specifically an online fingerprint verifying command, the financial card executes card holder verification according to a fingerprint of a user and returns information related to the card holder verification to the host computer specifically includes: the financial card waits for the user to input a fingerprint, if the financial card obtains the fingerprint input by the user, the financial card computes online fingerprint feature according to the obtained fingerprint and sends the online fingerprint feature to the host computer.

In the present disclosure, the method further includes: if the financial card determines that the received command is the verifying command and the verifying command is specifically an online fingerprint verifying command in Step S2, the financial card waits for the user to input a fingerprint; when the fingerprint input by the user is obtained by the financial card, the financial card verifies the fingerprint input by the user according to a self-stored user registration fingerprint, if the verification is successful, the financial card returns a self-stored online verification code to the host computer; otherwise, the financial card returns information that the verification is failed to the host computer.

In the present disclosure, when the fingerprint verifying command is specifically an offline fingerprint verifying command;

the financial card executes the card holder verification according to the fingerprint of the user and returns information related to card holder verification to the host computer specifically includes: the financial card waits for the user to input a fingerprint, when the fingerprint input by the user is obtained by the financial card, the financial card verifies the fingerprint input by the user according to self-stored user registration fingerprint, if the verification is successful, the financial card returns information that offline fingerprint verification is successful to the host computer; otherwise, the financial card returns information that offline fingerprint verification is failed to the host computer.

The method of the present disclosure further includes:

when the financial card determines that the received command is a verifying command and the verifying command is specifically an offline verifying command in the Step S2, the financial card waits for the user to input an offline verification code, when the offline verification code input by the user is obtained by the financial card, the financial card verifies the offline verification code input by the user according to self-stored offline verification code, if the verification is successful, the financial card returns information that offline verification is successful to the host computer; otherwise, the financial card returns information that offline verification is failed to the host computer.

Or, when the financial card determines that the received command is a verifying command and the verifying command is specifically an offline verification code verifying command in the Step S2, the financial card obtains an offline verification code from the offline verification code verifying command; when the offline verification code input by the user is obtained by the financial card, the financial card verifies the offline verification code input by the user according to self-stored offline verification code, if the verification is successful, the financial card returns information that offline verification is successful to the host computer; otherwise, the financial card returns information that offline verification is failed to the host computer.

When the financial card determines that the received command is a verifying command and the verifying command is specifically an offline verifying command in the Step S2, the financial card executes Step S91 to Step S93:

Step S91, the financial card determines whether the offline verifying command includes an offline verification code, if yes, executes Step S92; otherwise, executes Step S93;

Step S92, the financial card obtains the offline verification code from the offline verifying command, the financial card verifies the obtained offline verification code according to self-stored offline verification code, if the verification is successful, executes Step S93; otherwise, the financial card returns information that offline verification is failed;

Step S93, the financial card waits for the user to input a fingerprint, when the fingerprint input by the user is obtained by the financial card, the financial card verifies the fingerprint input by the user according to self-stored user registration fingerprint, if the verification is successful, the financial card returns information that the offline fingerprint verification is successful to the host computer; otherwise, the financial card returns information that the offline fingerprint verification is failed to the host computer.

Or, when the financial card determines that the received command is a verifying command and the verifying command is specifically an offline verifying command in Step S2, the financial card executes Step S101 to Step S103:

Step S101, the financial card determines whether the offline verification code is included in the offline verifying command, if yes, executes Step S102; otherwise, executes Step S103;

Step S102, the financial card obtains an offline verification code from the offline verifying command, verifies the obtained offline verification code according to self-stored offline verification code, if the verification is successful, the financial card returns information that the offline verification is successful to the host computer; if the verification is failed, the financial card returns information that the offline verification is failed to the host computer;

Step S103, the financial card waits for the user to input fingerprint, when the fingerprint input by the user is obtained by the financial card, the financial card verifies the fingerprint input by the user according to self-stored user registration fingerprint, if the verification is successful, the financial card returns information that the offline verification is successful to the host computer; otherwise, the financial card returns information that the offline verification is failed to the host computer.

The Step S2 of the present disclosure further includes: if the financial card determines that the received command is a transaction verifying command, executes Step S0;

Step S0, the financial card prompts the user to input transaction verifying information, verifies the transaction verifying information input by the user after the transaction verifying information input by the user is received, if the verification is successful, the financial card returns information that the verification is successful to the host computer; otherwise, the financial card returns information that the verification is failed to the host computer and ends transaction.

Specifically, the Step S0 specifically includes:

Step S01, the financial card prompts the user to input fingerprint;

Step S02, the financial card receives the fingerprint input by the user;

Step S03, the financial card verifies the fingerprint input by the user according to the self-stored user registration fingerprint, if the verification is successful, the financial card generates information that the verification is successful and returns information that the verification is successful to the host computer; otherwise, the financial card generates information that the verification is failed to the host computer and ends transaction.

Specifically, in the Step S03, the financial card verifies the fingerprint input by the user according to the self-stored user registration fingerprint is specifically that the financial card computes fingerprint feature according to the fingerprint input by the user, determines whether the computed fingerprint feature is consistent with the fingerprint feature of the self-stored user registration fingerprint, if yes, the verification is successful; otherwise, the verification is failed;

if the verification in the Step S03 is successful, the method further includes: the financial card stores the fingerprint feature computed according to the fingerprint input by the user.

Correspondingly, if the fingerprint verifying command is specifically an online fingerprint verifying command, the financial card executes card holder verification according to the fingerprint of the user and returns information related to the card holder verification to the host computer specifically includes: the financial card sends the computed fingerprint feature which is stored to the host computer.

Specifically, when the fingerprint verifying command is specifically an offline fingerprint verifying command, the financial card executes the card holder verification according to the fingerprint of the user and returns information related to card holder verification to the host computer specifically includes: the financial card generates a result of successful offline fingerprint verification and sends the result of successful offline fingerprint verification to the host computer.

Specifically, the Step S0 further includes:

Step L01, the financial card prompts the user to input a transaction verification code;

Step L02, the financial card obtains the transaction verification code input by the user;

Step L03, the financial card verifies the transaction verification code input by the user according to the self-stored transaction verification code, if the verification is successful, the financial card generates information that the verification is successful and returns the information that the verification is successful to the host computer; otherwise, the financial card generates information that the verification is failed and returns the information that the verification is failed to the host computer and ends transaction;

or, the Step S0 specifically includes:

Step W01, the financial card obtains the transaction verification code from a transaction verifying command;

Step W02, the financial card verifies the transaction verification code obtained from the transaction verifying command according to the self-stored transaction verification code, if the verification is successful, the financial card generates information that the verification is successful, and returns the information that the verification is successful to the host computer; otherwise, the financial card generates information that the verification is failed and returns the information that the verification is failed to the host computer and ends transaction.

Further, the method further includes: when the financial card determines that the received command is the verifying command in the Step S2 and the verifying command is specifically the offline verification code verifying command, the financial card generates a result of successful offline verification code verification according to the information that the verification is successful and sends the result of successful offline verification code verification to the host computer.

In the present disclosure, the financial card executes boot-up verification according to the self-stored user registration fingerprint and a fingerprint input by a user specifically includes:

Step H1, the financial card prompts the user to input fingerprint;

Step H2, when the financial card obtains the fingerprint input by the user, the financial card verifies the fingerprint input by the user according to the self-stored user registration fingerprint.

In the present disclosure, the financial card executes boot-up verification according to the self-stored user registration fingerprint and the fingerprint input by the user specifically includes: the financial card computes fingerprint feature according to the fingerprint input by the user, determines whether the computed fingerprint feature is consistent with the fingerprint feature of the self-stored user registration fingerprint, if yes, the verification is successful; otherwise, the verification is failed; if the verification is successful, the method further includes: the financial card stores the computed fingerprint feature.

Correspondingly, when the fingerprint verifying command is specifically the online fingerprint verifying command, the financial card executes the card holder verification according to the fingerprint of the user and returns information related to the card holder verification to the host computer specifically includes: the financial card sends the stored fingerprint feature to the host computer.

In the present disclosure, when the financial card executes boot-up verification according to the registered fingerprint and the fingerprint input by the user and the verification is successful, the method further includes: the financial card stores the result of successful verification;

Correspondingly, when the fingerprint verifying command is specifically the offline fingerprint verifying command, the financial card executes the card holder verification according to the fingerprint of the user and returns information related to the card holder verification to the host computer specifically includes: the financial card generates information that the offline fingerprint verification is successful according to the stored result of successful verification and sends the information that the offline fingerprint verification is successful to the host computer.

In the present disclosure, the financial card generates application cryptogram specifically includes: the financial card generates application cryptogram according to the information that the offline fingerprint verification is successful or the information that the offline fingerprint verification is failed.

In the present disclosure, when before the Step S1, the method further includes the financial card executes boot-up verification according to self-stored user registration fingerprint and the fingerprint input by the user when the boot-up event is received, and the boot-up verification is successful;

the file information sent by the financial card to the host computer in the Step S4 includes record information related to the online verification code; the application data sent by the financial card to the host computer in the Step S5 includes the online verification code corresponding to the recording information of the online verification code in the application data reading command.

In the method of present disclosure, the financial card executes boot-up verification according to the self-stored user registration fingerprint and the fingerprint input by a user specifically includes: the financial card computes fingerprint feature according to the fingerprint input by the user, determines whether the computed fingerprint feature is consistent with the fingerprint feature of the self-stored user registration fingerprint, if yes, the verification is successful; otherwise, the verification is failed; if the boot-up verification is successful, the method further includes: the financial card stores the computed fingerprint feature;

Correspondingly, the file information sent by the financial card to the host computer in the Step S4 includes record information related to the fingerprint feature; the application data sent by the financial card to the host computer in the Step S5 includes the fingerprint feature corresponding to the record information of the fingerprint feature in the read application data command.

Further, if the fingerprint verifying command is specifically the offline fingerprint verifying command, the financial card executes the card holder verification according to the fingerprint of the user and returns information related to the card holder verification to the host computer specifically includes: the financial card waits for the user to input fingerprint, when the fingerprint input by the user is obtained by the financial card, the financial card verifies the fingerprint input by the user according to self-stored user registration fingerprint; if the verification is successful, the financial card sends the information that the offline fingerprint verification is successful to the host computer; otherwise, the financial card sends information that the offline fingerprint verification is failed to the host computer.

In the present disclosure, the financial card receives a boot-up event is specifically that the financial card being powered up, or the financial card receives the boot-up event from a user.

Preferably, in the present disclosure, the financial card may communicate data with the host computer via Bluetooth, or via a contacting manner or a contactless manner.

Embodiment 2

The present embodiment provides a working method for a financial card with function of fingerprint verification. As shown in FIGS. 1A-1D, the method includes:

Step 101, the financial card waits to receive a command from a host computer.

Step 102, the financial card determines a type of the command when the command from a host computer is received, if the financial card determines that the received command is an application selecting command, executes Step 103; if the financial card determines that the received command is a processing option acquiring command, executes Step 104; if the financial card determines that the received command is an application data reading command, executes Step 105; if the financial card determines that the received command is a verifying command and the verifying command is an offline fingerprint verifying command, executes Step 106; if the financial card determines that the received command is a verifying command and the verifying command is an online fingerprint verifying command, executes Step 107; if the financial card determines that the received command is an application cryptogram acquiring command, executes Step 108.

Step 103, the financial card sends application information supported by itself to the host computer.

In the present embodiment, the application information includes parameters of card issuer, for example, application name of a selected application. The application information may include a Processing Options Data Object List (PDOL) that requires data element to be sent to the financial card by the host computer.

For example, the application selecting command received by the financial card is specifically: 00 A4 04 00 07 A0 00 00 00 04 10 10; data of the first byte and the second byte of the obtained command, i.e. 00 A4, is taken as an identification of the application selecting, the data of the third byte of the obtained command, i.e. 04, is taken as an identification selected by name; the data of the fifth byte of the obtained command, i.e. 07, is taken as length of data field; the data from the sixth byte to the twelfth byte of the obtained command, i.e. A0 00 00 00 04 10 10 is taken as name of terminal application.

The application information organized by the financial card according to the application name identification 84, the application name A0 00 00 00 04 10 10, application priority 87 and preferred language 5F 2D is specifically: 6F 49 84 07 A0 00 00 00 04 10 10 A5 3E 50 0A 4D 61 73 74 65 72 43 61 72 64 5F 2D 04 72 75 65 6E 87 01 01 9F 11 01 01 9F 12 0A 4D 61 73 74 65 72 43 61 72 64 BF 0C 14 9F 4D 02 0B 0A 9F 5D 03 00 00 00 9F 6E 06 06 43 00 00 30 30. In this case, the data of the third byte, i.e. 84 is the identification of application name, the data from the fifth byte to the eleventh byte, i.e. A0 00 00 00 04 10 10 is the application name; the data from the twenty-sixth byte to the twenty-seventh byte, i.e. 5F 2D is the identification of preferred language; the data of the thirty-third byte, i.e. 87 is application priority identification; the data of the thirty-fifth byte, i.e. 01 is priority which represents highest priority.

Step 104, the financial card sends file information to the host computer.

The file information includes an application file locator and an application interchange profile. In this case, the application file locator lists a short file identification, a record number, number of records and a location for saving static signing data required by offline data verification corresponding to data need to be read for transaction; the application interchange profile lists functions executed in transaction processing, for example, static offline data verification, dynamic offline data verification, compound dynamic offline data verification, verification of card holder, etc. The application interchange profile is written into the financial card when executing personalizing.

If the processing option acquiring command includes terminal data specified in PDOL, the Step 104 further includes: the financial card checks the terminal data specified in the obtained PDOL, if checking is successful, the financial card sends the application file locator and the application interchange profile to the host computer; if checking is failed, the financial card sends information that usage condition is not satisfied to the host computer.

For example, the processing option acquiring command received by the financial card is specifically: 80 A8 00 00 02 83 00, the data of the first byte and the second byte of the obtained command, i.e. 80 A8, is taken as identification of the processing option acquiring command;

Response data which is organized by the financial card according to the identification of application interchange profile 82, the application interchange profile 38 00, the identification of the application file locator 94 and the application file locator 10 02 02 01 18 01 01 00 20 01 01 00 28 01 02 00, and returned to the host computer is specifically: 77 16 82 02 38 00 94 10 10 02 02 01 18 01 01 00 20 01 01 00 28 01 02 00, in which the data of the third byte, i.e. 82, is the identification of the application interchange profile, the data of the fifth byte and the sixth byte, i.e. 38 00, is the application interchange profile; the data of the seventh byte, i.e. 94, is the file locator identification; the data from the ninth byte and the twenty-fourth byte, i.e. 10 02 02 01 18 01 01 00 20 01 01 00 28 01 02 00, is the application file locator.

Step 105, the financial card sends application data corresponding to the file identification in the application data reading command to the host computer.

Specifically, the file identification may include the short file identification and the record number.

For example, the application data reading command received by the financial card is specifically: 00 B2 02 2C 00; the data of the first byte and the second byte, i.e. 00 B2, of the obtained command is taken as the identification of the application data reading command; the data of the third byte and the fourth byte, i.e. 02 2C, of the obtained command is taken as the record number and the short file identification, which indicates that the file corresponding to the second record number in the fifth file is to be read.

The response data which is organized by the financial card according to public key certificate identification, i.e. 9F 46, and the public key certificate, i.e. 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A53 A2 E3 5B 0B E7 E3 19 95 89 69 77 8D D5 0A38 DC BE 78 7F DE 46A2 89 BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8E F4 1D FD B8 11 E9 4E FC 25 C1 66 EC EC FB 21 12 86 C4B5 0C 12 8C 02 E1 43 79 32 8B 4A 48 0D 4C DB 80 AA 40 F6 28 6D 61 7C 28 EF 9B 74 5A ED 3A C6 49 B4 10 17 A1 96 04 46, and returned to the host computer is: 70 81 BA 9F 46 81 B0 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A 53 A2 E3 5B 0B E7 E3 19 95 89 69 77 8D D5 0A 38 DC BE 78 7F DE 46 A2 89 BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8 EF4 1D FD B8 11 E9 4E FC 25 C1 66 EC EC FB 21 12 86 C4 B5 0C 12 8C 02 E1 43 79 32 8B 4A 48 0D 4C DB 80 AA 40 F6 28 6D 61 7C 28 EF 9B 74 5A ED 3A C6 49 B4 10 17 A1 96 04 46 9F 49 03 9F 37 04, in which the data of the fourth byte and the fifth byte, i.e. 9F 46, is the public key certificate identification; the data from the seventh data to the one hundred and eighty-third byte, i.e. 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A 53 A2 E3 5B 0B E7 E3 19 95 89 69 77 8D D5 0A 38 DC BE 78 7F DE 46 A2 89

BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8E F4 1D FD B8 11 E9 4E FC 25 C1 66 EC EC FB 21 12 86 C4B5 0C 12 8C 02 E1 43 79 32 8B 4A48 0D4C DB 80 AA 40 F6 28 6D 61 7C 28 EF 9B 74 5A ED 3A C6 49 B4 10 17 A1 96 04 46, is the public key certificate.

Step 106, the financial card waits for the user to input fingerprint, if the fingerprint input by the user is obtained by the financial card, the financial card verifies the fingerprint input by the user according to self-stored user registration fingerprint, if the verification is successful, the financial card returns information that offline fingerprint verification is successful to the host computer; if the verification is failed, the financial card returns information that offline fingerprint verification is failed to the host computer.

For example, the offline fingerprint verifying command received by the financial card is specifically: 00 20 01 00 00; the data of the first byte and the second byte of the command, i.e. 00 20, is taken as the identification of the verifying command; the data of the third byte of the command "01" is the identification of offline fingerprint verification.

Or, the offline fingerprint verifying command received by the financial card is specifically: 00 21 00 00 00; the data of the first byte and the second byte of the command, i.e. 00 21, is taken as the identification of offline fingerprint verifying command.

Further, if the verification in Step 106 is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 106. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

Step 107, the financial card waits for the user to input the fingerprint; when the fingerprint of the user is obtained by the financial card, the financial card computes online fingerprint feature according to the obtained fingerprint and sends the online fingerprint feature to the host computer.

For example, the online fingerprint verifying command received by the financial card is specifically: 00 20 02 00 00; the data of the first byte and the second byte, i.e. 00 20, of the command is taken as the identification of verifying command, the data of the third byte, i.e. 02, of the command is taken as the identification of verifying online fingerprint.

Further, in the Step 107, the method further includes: the financial card encrypts the online fingerprint feature to obtain encrypted online fingerprint feature; correspondingly, that the financial card sends the online fingerprint feature to the host computer is specifically: the financial card sends the encrypted online fingerprint feature to the host computer.

Further, after the Step 107, the method further includes: if the host computer receives the encrypted online fingerprint feature, the host computer sends the encrypted online fingerprint feature to a server; after the server receives the online fingerprint feature, the server verifies the received online fingerprint feature according to self-stored fingerprint feature.

Or, when the online fingerprint feature is received by the host computer, the host computer encrypts the online fingerprint feature to obtain the encrypted online fingerprint feature, sends the encrypted fingerprint feature to the server; after the server receives the encrypted online fingerprint feature, the server decrypts the encrypted online fingerprint feature to obtain the online fingerprint feature and verifies the decrypted fingerprint feature according to self-stored fingerprint feature.

Step 108, the financial card executes card behavior analysis and generates application cryptogram, sends the application cryptogram to the host computer.

For example, the application cryptogram acquiring command received by the financial card is specifically: 80 AE 80 00 42 00 00 00 00 12 00 00 00 00 00 00 00 06 43 00 80 00 08 00 06 43 17 08 16 00 3A CF 3B 63 22 00 00 BE 05 0D 31 37E8 6F F6 44 03 02 14 05 30 00 00 00 00 00 00 00 00 00 00 00 00 00 00 00 00 00 00 00; the data of the first byte and the second byte of the obtained command, i.e. 80 AE, is taken as the identification of the generate application cryptogram command.

The response data which is organized by the financial card according to an identification of ciphertext information data 27, the ciphertext information data 80, an identification of application cryptogram 26, the application cryptogram 81 4E F5 A4 E9 68 37 1B and returned to the host computer is specifically: 77 29 9F 27 01 80 9F 36 02 03 99 9F 26 08 81 4E F5 A4 E9 68 37 1B 9F 10 12 01 10 A7 80 03 02 00 00 BE 05 00 00 00 00 00 00 00 FF. In this case, the data of the fourth byte, i.e. 27, is the identification of ciphertext information data, the data of the sixth byte, i.e. 80, is the ciphertext information data indicating that type of the application cryptogram is an authorization request; the data of the thirteenth byte, i.e. 26, is the identification of the application cryptogram, the data from the fifteenth byte to the twenty-third byte, i.e. 81 4E F5 A4 E9 68 37 1B, is application cryptogram.

In this embodiment, the host computer may be a transaction terminal or a smart terminal. When the financial card waiting for the user to input a fingerprint, the host computer may prompt the user to input fingerprint.

Optionally, the method further includes: when the financial card determines that received command is verifying command and the verifying command is specifically online verifying command in the Step 102, the financial card waits for the user to input the fingerprint; when the fingerprint input by the user is obtained by the financial card, the financial card verifies the fingerprint input by the user according to self-stored user registration fingerprint, if the verification is successful, the financial card returns a self-stored online verification code to the host computer; otherwise, the financial card returns information that the verification is failed to the host computer.

For example, the received command is specifically: 00 20 00 00 02 00 00, the data of the first byte and the second byte, i.e. 00 20, of the obtained command is taken as the identification of the verifying command; the data of the sixth byte and the seventh byte, i.e. 00 00, of the obtained command is taken as the identification indicating that the fingerprint need to be input by the user and the online verification code need to be returned to the host computer.

Preferably, the method further includes: when the financial card determines that the received command is verifying command and the verifying command is specifically offline verification code verifying command in the Step 102, executes Step 109;

Step 109, the financial card waits for the user to input offline verification code; if the financial card obtains the offline verification code input by the user, the financial card verifies the offline verification code input by the user according to self-stored offline verification code, if the verification is successful, the financial card returns information that offline verification is successful to the host computer; otherwise, the financial card returns information that offline verification is failed to the host computer.

For example, the offline verification code verifying command received by the financial card is specifically: 00 20 00 00 02 00 00; the data of the first byte and the second byte, i.e. 00 20, of the obtained command is taken as the identification of verifying command; the data from the sixth byte to the seventh byte, i.e. 00 00, of the obtained command is taken as the identification indicating that the verification code need to be input by the user.

Further, in the Step 109, if the verification is failed, the method further includes that: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 106. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

Optionally, the method further includes: when the financial card determines that the received command is verifying command and the verifying command is specifically offline verification code verifying command in the Step 102, executes Step 110;

Step 110, the financial card obtains an offline verification code from the offline verification code verifying command and verifies the obtained offline verification code according to self-stored offline verification code, if the verification is successful, the financial card returns information that offline verification is successful; otherwise, the financial card returns information that offline verification is failed to the host computer.

For example, the offline fingerprint verifying command received by the financial card is specifically: 00 20 00 00 02 12 34; the data of the first byte and the second byte of the obtained command, i.e. 00 20, is taken as the identification of verifying command, the data of the fifth byte of the obtained command, i.e. 02, is taken as length of verification code, the data of the sixth byte and the seventh byte of the obtained command, i.e. 1234, is taken as offline verification code; the financial card determines whether the verification code in the command is consistent with the self-stored verification code, if yes, the financial card returns information that offline verification is successful to the host computer; otherwise, the financial card returns information that offline verification is failed to the host computer.

Further, in Step 110, if the verification is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 106. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

Optionally, the method further includes: when the financial card determines that the received command is verifying command and the verifying command is offline verifying command in the Step 102, executes the following steps:

Step R01, the financial card determines whether an offline verification code is included in the offline verifying command, if yes, executes Step R02; otherwise, executes Step R03;

For example, if the offline verifying command received by the financial card is 00 20 01 00 02 12 34, executes the Step RO; the data of the first byte and the second byte of the command, i.e. 00 20, is taken as identification of the verifying command; the data of the third byte of the command, i.e. 01, is taken as the identification indicating that the fingerprint need to be input by the user, the data of the third byte of the command, i.e. 00 20, is taken as the identification of the verifying command, the data of the fifth byte of the command, i.e. 02, is taken as length of verification code, data of the sixth byte and the seventh byte of the command, i.e. 12 34, is taken as verification code; if the offline verifying command received by the financial card is 00 20 00 00 02 FF FF, executes the Step R03; the data of the first byte and the second byte of the command, i.e. 00 20, is taken as identification of verifying command; the data of the fifth byte of the command, i.e. 02, is taken as length of verification code, the data of the sixth byte and the seventh byte of the command, i.e. FF FF, is taken as identification indicating that the fingerprint input by the user need to be verified.

Step R02, the financial card obtains the offline verification code from the offline verifying command, verifies the obtained offline verification code according to self-stored offline verification code, if the verification is successful, executes the Step R03; otherwise, return information that offline verification is failed to the host computer.

For example, the financial card takes the data of the sixth byte to the seventh byte, i.e. 12 34, of the offline verifying command 00 20 00 00 02 12 34 as the offline verification code, compares the taken offline verification code 12 34 with self-stored offline verification code 12 34, if they are consistent, executes Step R03.

Step R03, the financial card waits for the user to input fingerprint; when the fingerprint input by the user is obtained, the financial card verifies the fingerprint input by the user according to self-stored user registration fingerprint, if the verification is successful, the financial card returns information that offline fingerprint verification is successful to the host computer, otherwise, the financial card returns information that offline fingerprint verification is failed to the host computer.

In the technical solution provided by the present embodiment, if the user remembers the offline verification code, the user can choose to input the offline verification code on the host computer, the transaction would be more safer through the offline verification code and fingerprint two-step verification; if the user forgets the offline verification code, transaction can be executed without inputting the offline verification code on the host computer, the financial card will not stop executing transaction if the user forgot the offline verification code, which brings good experience to the user.

Further, in the Step R02, if the verification is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 106. For example, updating the number of failed verification times is specifically adding 1 to the number of failed verification times; the preset number is 3; updating the number of remaining verification times is: the number of remaining verification times=the preset number−the number of failed verifying times. Further, if the financial card determines that the number of failed verifying times does not exceed the preset number, the method further includes: the financial card displays the number of remaining verification times.

Optionally, the method further includes: when the financial card determines that the received command is verifying command and the verifying command is offline verifying command in Step 102, executes the following steps:

Step R11, the financial card determines whether the offline verifying command includes the offline verification code, if yes, executes Step R12; otherwise, executes Step R13;

For example, if the offline verifying command received by the financial card is 00 20 01 00 02 12 34, executes the Step R12; the data of the first byte and the second byte of the command, i.e. 00 20, is taken as identification of the verifying command; the data of the third byte of the command, i.e. 01, is taken as the identification indicating that the fingerprint input by the user need to be verified, the data of the third byte of the obtained command, i.e. 00 20, is taken as the identification of the verifying command, the data of the fifth byte of the obtained command, i.e. 02, is taken as length of verification code, the data of the sixth byte and the seventh byte of the obtained command, i.e. 12 34, is taken as verification code; if the offline verifying command received by the financial card is 00 20 00 00 02 00 00, executes the Step R13; the data of the first byte and the second byte of the obtained command, i.e. 00 20, is taken as identification of verify command; the data of the fifth byte of the obtained command, i.e. 02, is taken as length of verification code, the data of the sixth byte and the seventh byte of the obtained command, i.e. 00 00, is taken as identification indicating that the fingerprint input by the user need to be verified.

Step R12, the financial card obtains offline verification code from the offline verifying command, verifies the obtained offline verification code according to self-stored offline verification code, if the verification is successful, the financial card returns information that offline verification is successful to the host computer, otherwise, the financial card returns information that offline verification is failed to the host computer.

For example, the financial card takes the data of the sixth byte to the seventh byte, i.e. 12 34, of the offline verifying command 00 20 00 00 02 12 34 as the offline verification code, compares the taken offline verification code 12 34 with self-stored offline verification code 12 34, if they are consistent, the financial card returns information that offline verification is successful to the host computer.

Step R13, the financial card waits for the user to input fingerprint, if the fingerprint input by the user is obtained, the financial card verifies the fingerprint input by the user according to self-stored user registration fingerprint, if the verification is successful, the financial card returns information that offline verification is successful to the host computer, otherwise, the financial card returns information that offline verification is failed to the host computer.

Optionally, before the Step 101 of the present embodiment, the method further includes: when a boot-up event is received by the financial card, the financial card executes boot-up verification according to self-stored user registration fingerprint and the fingerprint input by the user, if the verification is successful, executes Step 101.

Specifically, in the present embodiment, the financial card receives boot-up event is specifically: the financial card being powered up, or the financial card receives the boot-up event from a user. For example, the financial card being powered up is specifically: the financial card is powered up by inserting the financial card in the card slot of a contact card reader, then the contact card reader is used to supply the financial card; or the financial card is powered up by entering contactless field of a contactless card reader, then the contactless card reader is used to supply the financial card; the financial card receives a boot-up event from the user is specifically: after the user presses power key of the financial card, the financial card receives the boot-up event. In the present embodiment, after the user presses the power key, the financial card is powered off automatically in a preset time, or the user presses power-off key to turn off.

Specifically, the financial card executes boot-up verification according to the fingerprint input by the user according to self-stored user registration fingerprint, specifically includes:

Step T1, the financial card prompts the user to input fingerprint;

Step T2, when the fingerprint input by the user is obtained by the financial card, verifies the fingerprint input by the user according to self-stored user registration fingerprint, if the verification is successful, executes Step 101;

Further, if the verification in the Step T2 is failed, the method further includes: the financial card updates the number of the failed verification times, determines whether the number of failed verification times exceeds a preset number, if yes, ends the procedure; otherwise, executes the Step T1; for example, if the preset number is 3, updating the number of the failed verification times is specifically adding 1 to the number of failed verification times.

Furthermore, if the financial card determines that the number of failed verification times does not exceed the preset number, in process of waiting for the user to input the fingerprint or before waiting for the user to input fingerprint, the method further includes: the financial card updates the number of remaining verification times and displays the updated number of remaining verification times. For example, the method for updating the number of the remaining verification times is: the number of remaining verification times=the preset number−the number of failed verification times.

In the present embodiment, the financial card executes boot-up verification according to self-stored user registration fingerprint and the fingerprint input by the user is specifically: the financial card computes fingerprint feature according to the fingerprint input by the user, determines whether the computed fingerprint feature is consistent with the fingerprint feature of self-stored user registration fingerprint, if yes, the verification is successful; otherwise, the verification is failed.

If the verification is successful, the method further includes: the financial card stores the computed fingerprint feature;

Step 107 may also specifically include: the financial card sends the stored fingerprint feature to the host computer.

The file information sent by the financial card to the host computer in the Step 104 includes record information related to the fingerprint feature; specifically, the record information related to the fingerprint feature includes a short file identification of the file included the fingerprint feature and a corresponding record number;

the application data sent by the financial card to the host in the Step 105 computer includes fingerprint feature corresponding to the record information of the fingerprint feature in the application data reading command. Specifically, the record information of the fingerprint feature specifically includes the short file identification of the file included the fingerprint feature and the corresponding record number.

In the present embodiment, when the financial card executes boot-up verification according to self-registered fingerprint and the fingerprint input by the user and the verification is successful, the method further includes: the financial card stores a result of successful verification.

Step 106 may also specifically include: the financial card generates information that offline fingerprint verification is successful according to the result of successful verification and sends the information that the offline fingerprint verification is successful to the host computer.

In the present embodiment, when before the Step 101, the method further comprises: if the financial card receives a boot-up event, executing, by the financial card, boot-up verification according to a self-stored user registration fingerprint and a fingerprint input by a user, and if the verification is successful: the file information sent by the financial card to the host computer in the Step 104 includes record information related to the online verification code; specifically, the record information related to the online verification code includes a short file identification of a file included the online verification and the corresponding record number;

the application data sent by the financial card to the host computer in Step 105 includes online verification code corresponding to the record information of the online verification code in the application data reading command. Specifically, the record information of the online verification code specifically includes a short file identification of a file included the online verification code and a corresponding record number.

In the present embodiment, the financial card executes boot-up verification according to self-stored user registration fingerprint and the fingerprint input by the user can be replaced by: the financial card executes boot-up verification according to self-stored boot-up verification code and the fingerprint input by the user.

Specifically, the financial card executes boot-up verification according to self-stored boot-up verification code and the boot-up verification code input by the user specifically includes:

Step M1, the financial card prompts the user to input the boot-up verification code;

Step M2, when the boot-up verification code input by the user is obtained by the financial card, the financial card verifies the boot-up verification code input by the user according to self-stored boot-up verification code, if the verification is successful, executes Step 101;

Further, if the verification in Step M2 is failed, the method further includes: the financial card updates the number of the failed verification times, determines whether the number of failed verification times exceeds a preset number, if yes, ends the procedure; otherwise, executes the Step T1; for example, if the preset number is 3, updating the number of the failed verification times is specifically adding 1 to the number of failed verification times.

Furthermore, if the financial card determines that the number of failed verification times does not exceed the preset number, in process of waiting for the user to input the fingerprint or before waiting for the user to input fingerprint, the method further includes: the financial card updates the number of remaining verification times and displays the updated number of remaining verification times. For example, the method for updating the number of the remaining verification times is: the number of remaining verification times=the preset number−the number of failed verification times.

Preferably, the Step 102 further includes: if the received command is transaction verifying command, executes Step S0.

Step S0, the financial card prompts the user to input transaction verifying information; after the transaction verifying information input by the user is received, the financial card verifies transaction verifying information input by the user, if the verification is successful, the financial card returns information that the verification is successful to the host computer; otherwise, the financial card returns information that the verification is failed to the host computer and ends transaction.

Specifically, Step S0 specifically includes:

Step S01, the financial card prompts the user to input fingerprint;

Step S02, the financial card receives fingerprint input by the user.

Step S03, the financial card verifies the fingerprint input by the user according to self-stored user registration fingerprint, if the verification is successful, the financial card generates information that the verification is successful and returns information that the verification is successful to the host computer; otherwise, the financial card generates information that the verification is failed and returns information that the verification is failed to the host computer and ends transaction.

In the present embodiment, in Step S03, the financial card verifies the fingerprint input by the user according to self-stored user registration fingerprint is specifically: the financial card computes fingerprint feature according to the fingerprint input by the user, determines whether the computed fingerprint feature is consistent with the fingerprint feature of self-stored user registration fingerprint, if yes, the verification is successful; otherwise, the verification is failed;

if the verification in the Step S03 is successful, further includes: the financial card stores the fingerprint feature computed according to the fingerprint input by the user;

Correspondingly, the Step 107 in the present embodiment may also be: the financial card sends the stored fingerprint feature to the host computer.

In the present embodiment, Step 106 may also be: the financial card generates a result of successful offline fingerprint verification according to information that the verification is successful and sends the result of successful offline fingerprint verification to the host computer.

Or, the Step S0 may also specifically include:

Step L01, the financial card prompts the user to input a transaction verification code;

Step L02, the financial card obtains the transaction verification code input by the user;

Step L03, the financial card verifies the transaction verification code input by the user according to self-stored transaction verification code, if the verification is successful, the financial card generates information that the verification is successful and returns information that the verification is successful to the host computer; otherwise, the financial card generates information that the verification is failed and returns information that the verification is failed to the host computer and ends transaction.

Or, Step S0 may also specifically include:

Step W01, the financial card obtains the transaction verification code from the transaction verifying command;

Step W02, the financial card obtains the transaction verification code from the transaction verifying command according to self-stored verification code, if the verification is successful, the financial card generates information that the verification is successful and sends the information that the verification is successful to the host computer; otherwise, the financial card generates information that the verification is failed and sends information that the verification is failed to the host computer, ends transaction.

The method in the present embodiment further includes: if the command received is verifying command and the verifying command is offline verification code verifying command in Step 102, the financial card generates a result of successful offline verification code verification according to the offline verification code verifying command and sends the result of successful offline verification code verification to the host computer.

Optionally, in the present embodiment, the financial card generates application cryptogram may be specifically: the financial card generates application cryptogram according to the information that offline fingerprint verification is successful or the information that offline fingerprint verification is failed.

In the present embodiment, when the financial card waits for the user to input fingerprint, the method further includes that the financial card prompts the user to input fingerprint.

Specifically, the financial card prompts the user to input fingerprint is specifically: the financial card prompts the user to input fingerprint via a display screen, an indicator light or voice.

In the present disclosure, the method further includes an operation of entering a fingerprint on the financial card. In the present embodiment, the self-stored user registration fingerprint of the financial card is registered and entered during the operation of entering a fingerprint.

In the present disclosure, the operation of entering the fingerprint on the financial card may be executed when the financial card is personalized, the user enters the fingerprint at the bank service desk; or when the user himself/herself enters the fingerprint on the financial card.

Specifically, the operation of entering the fingerprint on the financial is specifically: the financial card receives a fingerprint entering event, waits for the user to enter the fingerprint, when the fingerprint entered by the user is received by the financial card, the financial card stores the entered fingerprint; or the operation of entering the fingerprint on the financial is specifically: when the financial card receives the fingerprint entering command (the financial card is personalized) from the host computer, the financial card waits for the user to enter fingerprint; when the financial card receives the fingerprint entered by the user, the financial card stores the entered fingerprint.

Further, the financial card receives a fingerprint entering event is specifically: the financial card receives the fingerprint entering event from the user (the user enters the fingerprint by himself/herself). For example, the financial card receives the fingerprint entering event from the user is specifically: after the user presses a fingerprint entering function key on the financial card, the financial card receives the fingerprint entering event from the user; or the user presses a function key, the financial key displays a function menu, when the user selects fingerprint entering function in the function menu, the financial card receives the fingerprint entering event from the user.

In the present embodiment, after the financial card receives the fingerprint entering event or the fingerprint entering command, the method further includes that the financial card prompts the user to enter fingerprint; specifically, the financial card prompts the user to enter fingerprint via one or more of display screen, indicator light or voice.

The operation of entering the fingerprint on the financial may also specifically include: the financial card receives a fingerprint from a fingerprint collector (the fingerprint entered when the financial card is personalized), and stores the received fingerprint.

Optionally, in the method of the present embodiment, the financial card executes data communication with the host computer via Bluetooth; the financial card may also execute data communication with the host computer via contact way or contactless way.

Optionally, in the present embodiment, after the financial card executes each step of the Step 103 to the Step 110, the method further includes that the financial card executes operating of the Step 101.

Embodiment 3

Figure 2A:
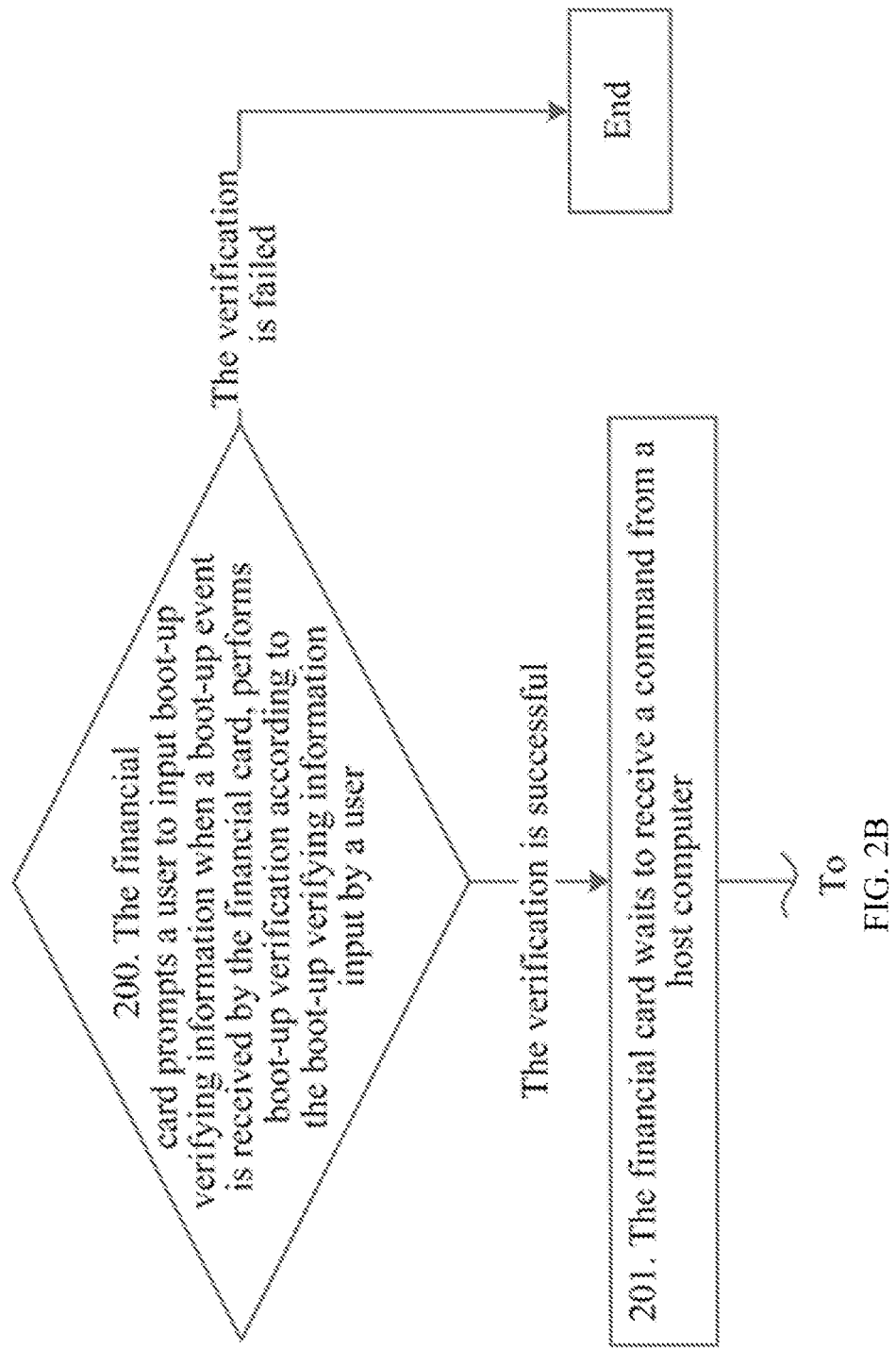
Figure 2B:
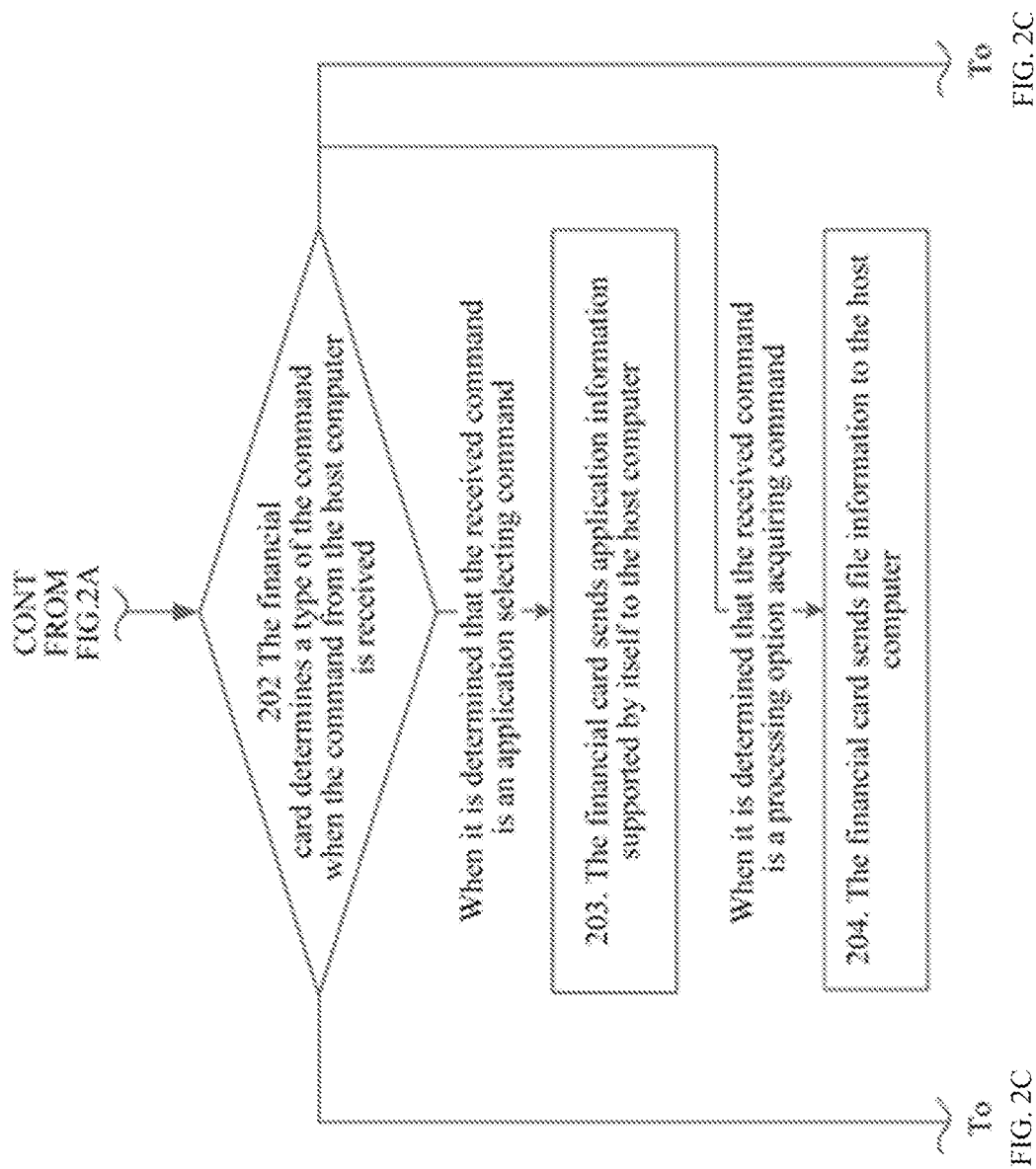

The present embodiment provides a working method for a financial card with function of fingerprint verification. As shown in FIGS. 2A-2C, the method includes:

Step 200, the financial card prompts a user to input boot-up verifying information when a boot-up event is received by the financial card, executes boot-up verification according to the boot-up verifying information input by a user, if the verification is successful, executes Step 201; if the verification is failed, ends procedure.

Specifically, the financial card receives boot-up event is specifically: the financial card being powered up, or the financial card receives the boot-up event from a user. For example, the financial card being powered up is specifically: the financial card is powered up by inserting the financial card in the card slot of a contact card reader, then the contact card reader is used to supply the financial card; or the financial card is powered up by entering contactless field of a contactless card reader, then the contactless card reader is used to supply the financial card; the financial card receives a boot-up event from the user is specifically: after the user presses power key of the financial card, the financial card receives the boot-up event. In the present embodiment, after the user presses the power key, the financial card is powered off automatically in a preset time, or the user presses power-off key to turn off.

In the present embodiment, the financial card prompts the user to input boot-up verifying information and executes boot-up verification according to the boot-up verifying information specifically includes: the financial card prompts the user to input fingerprint and executes boot-up verification according to self-stored user registration fingerprint and the fingerprint input by the user; or the financial card prompts the user to input boot-up verification code and executes boot-up verification according to self-stored boot-up verification code and the boot-up verification code input by the user.

Specifically, the financial card prompts the user to input fingerprint and executes boot-up verification according to self-stored user registration fingerprint and the fingerprint input by the user specifically includes:

Step T1, the financial card prompts the user to input fingerprint;

Step T2, when the fingerprint input by the user is obtained by the financial card, verifies the fingerprint input by the user according to self-stored user registration fingerprint, if the verification is successful, executes Step 201.

Further, if the verification in the Step T2 is failed, the method further includes: the financial card updates the number of the failed verification times, determines whether the number of failed verification times exceeds a preset number, if yes, ends the procedure; otherwise, executes the Step T1; for example, if the preset number is 3, updating the number of the failed verification times is specifically adding 1 to the number of failed verification times.

Furthermore, if the financial card determines that the number of failed verification times does not exceed the preset number, in process of waiting for the user to input the fingerprint or before waiting for the user to input fingerprint, the method further includes: the financial card updates the number of remaining verification times and displays the updated number of remaining verification times. For example, the method for updating the number of the remaining verification times is: the number of remaining verification times=the preset number−the number of failed verification times.

Specifically, the financial card prompts the user to input the boot-up verification code, and executes boot-up verification according to self-stored boot-up verification code and the verification code input by the user specifically includes:

Step M1, the financial card prompts the user to input boot-up verification code;

Step M2, when the boot-up verification code input by the user is obtained by the financial card, the financial card verifies the boot-up verification code input by the user according to self-stored boot-up verification code, if the verification is successful, executes Step 201; if the verification failed, goes back to the Step M1 or ends procedure.

Further, if the verification in Step M2 is failed, the method further includes: the financial card updates the number of the failed verification times, determines whether the number of failed verification times exceeds a preset number, if yes, ends the procedure; otherwise, executes the Step T1; for example, if the preset number is 3, updating the number of the failed verification times is specifically adding 1 to the number of failed verification times.

Furthermore, if the financial card determines that the number of failed verification times does not exceed the preset number, in process of waiting for the user to input the fingerprint or before waiting for the user to input fingerprint, the method further includes: the financial card updates the number of remaining verification times and displays the updated number of remaining verification times. For example, the method for updating the number of the remaining verification times is: the number of remaining verification times=the preset number−the number of failed verification times.

Step 201, the financial card waits to receive a command from a host computer;

Step 202, the financial card determines a type of the command when the command from the host computer is received, if the financial card determines that the type of the command is an application selecting command, executes Step S203; if the financial card determines that the type of the command is a processing option acquiring command, executes Step S204; if the financial card determines that the type of the command is an application data reading command, executes Step S205; if the financial card determines that the type of the command is an application cryptogram acquiring command, executes Step S206.

Step 203, the financial card sends application information supported by itself to the host computer.

In the present embodiment, the application information includes parameters of card issuer, for example, application name of a selected application. The application information may include a Processing Options Data Object List (PDOL) that requires data element to be sent to the financial card by the host computer.

For example, the application selecting command received by the financial card is specifically: 00 A4 04 00 07 A0 00 00 00 04 10 10; data of the first byte and the second byte of the obtained command, i.e. 00 A4, is taken as an identification of the application selecting, the data of the third byte of the obtained command, i.e. 04, is taken as an identification selected by name; the data of the fifth byte of the obtained command, i.e. 07, is taken as length of data field; the data from the sixth byte to the twelfth byte of the obtained command, i.e. A0 00 00 00 04 10 10 is taken as name of terminal application.

The application information organized by the financial card according to the application name identification 84, the application name A0 00 00 00 04 10 10, application priority 87 and preferred language 5F 2D is specifically: 6F 49 84 07 A0 00 00 00 04 10 10 A5 3E 50 0A 4D 61 73 74 65 72 43 61 72 64 5F 2D 04 72 75 65 6E 87 01 01 9F 11 01 01 9F 12 0A 4D 61 73 74 65 72 43 61 72 64 BF 0C 14 9F 4D 02 0B 0A 9F 5D 03 00 00 00 9F 6E 06 06 43 00 00 30 30. In this case, the data of the third byte, i.e. 84 is the identification of application name, the data from the fifth byte to the eleventh byte, i.e. A0 00 00 00 04 10 10 is the application name; the data from the twenty-sixth byte to the twenty-seventh byte, i.e. 5F 2D is the identification of preferred language; the data of the thirty-third byte, i.e. 87 is application priority identification; the data of the thirty-fifth byte, i.e. 01 is priority which represents highest priority.

Step 204, the financial card sends file information to the host computer.

The file information includes an application file locator and an application interchange profile. In this case, the application file locator lists a short file identification, a record number, number of records and a location for saving static signing data required by offline data verification corresponding to data need to be read for transaction; the application interchange profile lists functions executed in transaction processing, for example, static offline data verification, dynamic offline data verification, compound dynamic offline data verification, verification of card holder, etc. The application interchange profile is written into the financial card when executing personalizing.

If the processing option acquiring command includes terminal data specified in PDOL, the Step 204 further includes: the financial card checks the terminal data specified in the obtained PDOL, if checking is successful, the financial card sends the application file locator and the application interchange profile to the host computer; if checking is failed, the financial card sends information that usage condition is not satisfied to the host computer.

For example, the processing option acquiring command received by the financial card is specifically: 80 A8 00 00 02 83 00, the data of the first byte and the second byte of the obtained command, i.e. 80 A8, is taken as identification of the processing option acquiring command;

Response data which is organized by the financial card according to the identification of application interchange profile 82, the application interchange profile 38 00, the identification of the application file locator 94 and the application file locator 10 02 02 01 18 01 01 00 20 01 01 00 28 01 02 00, and returned to the host computer is specifically: 77 16 82 02 38 00 94 10 10 02 02 01 18 01 01 00 20 01 01 00 28 01 02 00, in which the data of the third byte, i.e. 82, is the identification of the application interchange profile, the data of the fifth byte and the sixth byte, i.e. 38 00, is the application interchange profile; the data of the seventh byte, i.e. 94, is the file locator identification; the data from the ninth byte and the twenty-fourth byte, i.e. 10 02 02 01 18 01 01 00 20 01 01 00 28 01 02 00, is the application file locator.

Step 205, the financial card sends application data corresponding to the file identification in the application data reading command to the host computer.

Specifically, the file identification may include the short file identification and the record number.

For example, the application data reading command received by the financial card is specifically: 00 B2 02 2C 00; the data of the first byte and the second byte, i.e. 00 B2, of the obtained command is taken as the identification of the application data reading command; the data of the third byte and the fourth byte, i.e. 02 2C, of the obtained command is taken as the record number and the short file identification, which indicates that the file corresponding to the second record number in the fifth file is to be read.

The response data which is organized by the financial card according to public key certificate identification, i.e. 9F 46, and the public key certificate, i.e. 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A 53 A2 E3 5B 0B E7 E3 19 95 89 69 77 8D D5 0A 38 DC BE 78 7F DE 46 A2 89 BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8E F4 1D FD B8 11 E9 4E FC 25 C1 66 EC EC FB 21 12 86 C4 B5 0C 12 8C 02 E1 43 79 32 8B 4A 48 0D 4C DB 80 AA 40 F6 28 6D 61 7C 28 EF 9B 74 5A ED 3A C6 49 B4 10 17 A1 96 04 46, and returned to the host computer is: 70 81 BA 9F 46 81 B0 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A 53 A2 E3 5B 0B E7 E3 19 95 89 69 77 8D D5 0A 38 DC BE 78 7F DE 46 A2 89 BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8E F4 1D FD B8 11 E9 4E FC 25 C1 66 EC EC FB 21 12 86 C4 B5 0C 12 8C 02 E1 43 79 32 8B 4A 48 0D 4C DB 80 AA 40 F6 28 6D 61 7C 28 EF 9B 74 5A ED 3A C6 49 B4 10 17 A1 96 04 46 9F 49 03 9F 37 04, in which the data of the fourth byte and the fifth byte, i.e. 9F 46, is the public key certificate identification; the data from the seventh data to the one hundred and eighty-third byte, i.e. 59 BB 97 63 1D 8B 85 78 53 18 21 34 63 BE 71 24 FF BB 23 DF E5 F4 AA CA 08 3C 48 88 77 1E CF 2E 21 1E CB 0C 81 CF 0A 53 A2 E3 5B 0B E7 E3 19 95 89 69 77 8D D5 0A 38 DC BE 78 7F DE 46 A2 89 BA 08 B2 28 6C 97 BF 27 12 30 85 7F 2A 56 AC F2 50 38 4B A7 B2 27 35 3F 99 C1 D5 6C 3A DD DA 53 17 3C A8 8B 63 8C 0C 36 4F 19 EE EC 5E AC F0 6A DF FB B3 86 74 BB 99 8E F4 1D FD B8 11 E9 4E FC 25 C1 66 EC EC FB 21 12 86 C4B5 0C 12 8C 02 E1 43 79 32 8B 4A48 0D4C DB 80 AA 40 F6 28 6D 61 7C 28 EF 9B 74 5A ED 3A C6 49 B4 10 17 A1 96 04 46, is the public key certificate.

Step 206, the financial card executes card behavior analysis and generates application cryptogram, sends the application cryptogram to the host computer.

For example, the application cryptogram acquiring command received by the financial card is specifically: 80 AE 80 00 42 00 00 00 00 12 00 00 00 00 00 00 00 06 43 00 80 00 08 00 06 43 17 08 16 00 3A CF 3B 63 22 00 00 BE 05 0D 31 37 E8 6F F6 44 03 02 14 05 30 00 00 00 00 00 00 00 00 00 00 00 00 00 00 00 00 00 00 00 00; the data of the first byte and the second byte of the obtained command, i.e. 80 AE, is taken as the identification of the generate application cryptogram command.

The response data which is organized by the financial card according to an identification of ciphertext information data 27, the ciphertext information data 80, an identification of application cryptogram 26, the application cryptogram 81 4E F5 A4 E9 68 37 1B and returned to the host computer is specifically: 77 29 9F 27 01 80 9F 36 02 03 99 9F 26 08 81 4E F5 A4 E9 68 37 1B 9F 10 12 01 10 A7 80 03 02 00 00 BE 05 00 00 00 00 00 00 00 FF. In this case, the data of the fourth byte, i.e. 27, is the identification of ciphertext information data, the data of the sixth byte, i.e. 80, is the ciphertext information data indicating that type of the application cryptogram is an authorization request; the data of the thirteenth byte, i.e. 26, is the identification of the application cryptogram, the data from the fifteenth byte to the twenty-third byte, i.e. 81 4E F5 A4 E9 68 37 1B, is application cryptogram.

In this embodiment, the host computer may be a transaction terminal or a smart terminal. When the financial card waiting for the user to input a fingerprint, the host computer may prompt the user to input fingerprint.

Optionally, the file information sent by the financial card to the host computer in the Step 204 includes record information related to the online verification code; specifically, the record information related to the online verification code includes a short file identification of a file included the online verification and the corresponding record number.

Correspondingly, the application data sent by the financial card to the host computer in Step 205 includes online verification code corresponding to the record information of the online verification code in the application data reading command. Specifically, the record information of the online verification code specifically includes a short file identification of a file included the online verification code and a corresponding record number.

Optionally, in the Step T2, the financial card executes boot-up verification according to self-stored user registration fingerprint and the fingerprint input by the user is specifically: the financial card computes fingerprint feature according to the fingerprint input by the user, determines whether the computed fingerprint feature is consistent with the fingerprint feature of self-stored user registration fingerprint, if yes, the verification is successful; otherwise, the verification is failed.

In Step T2, if the boot-up verification is successful, the method further includes: the financial card stores the computed fingerprint feature.

Correspondingly, the file information sent by the financial card to the host computer in the Step 204 includes record information related to the fingerprint feature; specifically, the record information related to the fingerprint feature includes a short file identification of the file included the fingerprint feature and a corresponding record number.

Correspondingly, the application data sent by the financial card to the host in the Step 205 computer includes fingerprint feature corresponding to the record information of the fingerprint feature in the application data reading command. Specifically, the record information of the fingerprint feature specifically includes the short file identification of the file included the fingerprint feature and the corresponding record number.

Optionally, the method further includes: if the financial card determines that the received command is verifying command and the verifying command is offline fingerprint verifying command in Step 202, executes Step 207.

Step 207, the financial card waits for the user to input fingerprint, if the fingerprint input by the user is obtained by the financial card, the financial card verifies the fingerprint input by the user according to self-stored user registration fingerprint, if the verification is successful, the financial card returns information that offline fingerprint verification is successful to the host computer; otherwise, the financial card returns information that offline fingerprint verification is failed to the host computer.

For example, the offline fingerprint verifying command received by the financial card is specifically: 00 20 01 00 00; the data of the first byte and the second byte of the command, i.e. 00 20, is taken as the identification of the verifying command; the data of the third byte of the command "01" is the identification of offline fingerprint verification.

Or, the offline fingerprint verifying command received by the financial card is specifically: 00 21 00 00 00; the data of the first byte and the second byte of the command, i.e. 00 21, is taken as the identification of offline fingerprint verifying command.

Further, if the verification in Step 207 is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 207. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

In the present embodiment, when the verification in the Step T2 is successful, the method further includes: the financial card stores the result of successful verification;

The Step 207 may also specifically include: the financial card generates information that offline fingerprint verification is successful according to the result of successful verification and sends the information that the offline fingerprint verification is successful to the host computer.

Optionally, the method further includes: if the financial card determines that the received command is verifying command, and the verifying command is specifically online fingerprint verifying command in Step 202, executes Step 208.

Step 208, the financial card waits for the user to input the fingerprint; when the fingerprint of the user is obtained by the financial card, the financial card computes online fingerprint feature according to the obtained fingerprint and sends the online fingerprint feature to the host computer.

For example, the online fingerprint verifying command received by the financial card is specifically: 00 20 02 00 00; the data of the first byte and the second byte, i.e. 00 20, of the command is taken as the identification of verifying command, the data of the third byte, i.e. 02, of the command is taken as the identification of verifying online fingerprint.

Further, in the Step 208, the method further includes: the financial card encrypts the online fingerprint feature to obtain encrypted online fingerprint feature, correspondingly, that the financial card sends the online fingerprint feature to the host computer is specifically: the financial card sends the encrypted online fingerprint feature to the host computer.

Further, after the Step 208, the method further includes: if the host computer receives the encrypted online fingerprint feature, the host computer sends the encrypted online fingerprint feature to a server, when the online fingerprint feature is received by the host computer, the host computer encrypts the online fingerprint feature to obtain the encrypted online fingerprint feature, sends the encrypted fingerprint feature to the server, after the server receives the encrypted online fingerprint feature, the server decrypts the encrypted online fingerprint feature to obtain the online fingerprint feature and verifies the decrypted fingerprint feature according to self-stored fingerprint feature.

In the present disclosure, in the Step T2, the financial card executes boot-up verification according to self-stored user registration fingerprint and the fingerprint input by the user is specifically: the financial card computes fingerprint feature according to the fingerprint input by the user, determines whether the computed fingerprint feature is consistent with the fingerprint feature of self-stored user registration fingerprint, if yes, the verification is successful; otherwise, the verification is failed; if the verification is successful, the method further includes: the financial card stores the computed fingerprint feature.

The Step 208 may also specifically include: the financial card sends the stored fingerprint feature to the host computer.

Optionally, the method further includes: when the financial card determines that received command is verifying command and the verifying command is specifically online verifying command in the Step 202, the financial card waits for the user to input the fingerprint; when the fingerprint input by the user is obtained by the financial card, the financial card verifies the fingerprint input by the user according to self-stored user registration fingerprint, if the verification is successful, the financial card returns a self-stored online verification code to the host computer; otherwise, the financial card returns information that the verification is failed to the host computer.

For example, the received command is specifically: 00 20 00 00 02 00 00, the data of the first byte and the second byte, i.e. 00 20, of the obtained command is taken as the identification of the verifying command; the data of the sixth byte and the seventh byte, i.e. 00 00, of the obtained command is taken as the identification indicating that the fingerprint need to be input by the user and the online verification code need to be returned to the host computer.

Optionally, the method further includes: when the financial card determines that the received command is verifying command and the verifying command is specifically offline verification code verifying command in the Step 202, executes Step 209.

Step 209, the financial card waits for the user to input offline verification code; if the financial card obtains the offline verification code input by the user, the financial card verifies the offline verification code input by the user according to self-stored offline verification code, if the verification is successful, the financial card returns information that offline verification is successful to the host computer; otherwise, the financial card returns information that offline verification is failed to the host computer.

For example, the offline verification code verifying command received by the financial card is specifically: 00 20 00 00 02 00 00; the data of the first byte and the second byte, i.e. 00 20, of the obtained command is taken as the identification of verifying command; the data from the sixth byte to the seventh byte, i.e. 00 00, of the obtained command is taken as the identification indicating that the verification code need to be input by the user.

Further, in the Step 209, if the verification is failed, the method further includes that: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step 209. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

In the present embodiment, if the verification in the Step M2 is successful, the method further includes: the financial card stores a result of successful verification;

The Step 209 may also specifically include: the financial card generates a result of successful offline verification according to a stored result of successful verification and sends the result of successful offline verification code verification to the host computer.

Optionally, the method further includes: if the financial card determines that the received command is verifying command and the verifying command is offline code verifying command in Step 202, executes Step 210;

Step 210, the financial card obtains an offline verification code from the offline verification code verifying command and verifies the obtained offline verification code according to self-stored offline verification code, if the verification is successful, the financial card returns information that offline verification is successful; otherwise, the financial card returns information that offline verification is failed to the host computer.

For example, the offline fingerprint verifying command received by the financial card is specifically: 00 20 00 00 02 12 34; the data of the first byte and the second byte of the obtained command, i.e. 00 20, is taken as the identification of verifying command, the data of the fifth byte of the obtained command, i.e. 02, is taken as length of verification code, the data of the sixth byte and the seventh byte of the obtained command, i.e. 12 34, is taken as offline verification code; the financial card determines whether the verification code in the command is consistent with the self-stored verification code, if yes, the financial card returns information that offline verification is successful to the host computer; otherwise, the financial card returns information that offline verification is failed to the host computer.

Further, in Step 210, if the verification is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, goes back to execute the Step 210. For example, updating the number of failed verification times is specifically adding 1 to the number of failed verification times; the preset number is 3; updating the number of remaining verification times is: the number of remaining verification times=the preset number−the number of failed verification times. Further, if the financial card determines that the number of failed verification times does not exceed the preset number, the method further includes: the financial card displays the number of remaining verification times.

In the present embodiment, when the verification is successful in Step M2, the method further includes that the financial card stores a result of successful verification.

The Step 210 may also specifically include: the financial card generates information that offline fingerprint verification is successful according to the result of successful verification and sends the information that offline fingerprint verification is successful to the host computer.

Optionally, the method further includes: when the financial card determines that the received command is verifying command and the verifying command is offline verifying command in the Step 202, executes the following steps:

Step R01, the financial card determines whether an offline verification code is included in the offline verifying command, if yes, executes Step R02; otherwise, executes Step R03.

For example, if the offline verifying command received by the financial card is 00 20 01 00 02 12 34, executes the Step RO; the data of the first byte and the second byte of the command, i.e. 00 20, is taken as identification of the verifying command; the data of the third byte of the command, i.e. 01, is taken as the identification indicating that the fingerprint need to be input by the user, the data of the third byte of the command, i.e. 00 20, is taken as the identification of the verifying command, the data of the fifth byte of the command, i.e. 02, is taken as length of verification code, data of the sixth byte and the seventh byte of the command, i.e. 12 34, is taken as verification code; if the offline verifying command received by the financial card is 00 20 00 00 02 FF FF, executes the Step R03; the data of the first byte and the second byte of the command, i.e. 00 20, is taken as identification of verifying command; the data of the fifth byte of the command, i.e. 02, is taken as length of verification code, the data of the sixth byte and the seventh byte of the command, i.e. FF FF, is taken as identification indicating that the fingerprint input by the user need to be verified.

Step R02, the financial card obtains the offline verification code from the offline verifying command, verifies the obtained offline verification code according to self-stored offline verification code, if the verification is successful, executes the Step R03; otherwise, return information that offline verification is failed to the host computer.

For example, the financial card takes the data of the sixth byte to the seventh byte, i.e. 12 34, of the offline verifying command 00 20 00 00 02 12 34 as the offline verification code, compares the taken offline verification code 12 34 with self-stored offline verification code 12 34, if they are consistent, executes Step R03.

Step R03, the financial card waits for the user to input fingerprint; when the fingerprint input by the user is obtained, the financial card verifies the fingerprint input by the user according to self-stored user registration fingerprint, if the verification is successful, the financial card returns information that offline fingerprint verification is successful to the host computer, otherwise, the financial card returns information that offline fingerprint verification is failed to the host computer.

In the technical solution provided by the present embodiment, if the user remembers the offline verification code, the user can choose to input the offline verification code on the host computer, the transaction would be more safer through the offline verification code and fingerprint two-step verification; if the user forgets the offline verification code, transaction can be executed without inputting the offline verification code on the host computer, the financial card will not stop executing transaction if the user forgot the offline verification code, which brings good experience to the user.

Further, in the Step R02, if the verification is failed, the method further includes: the financial card updates the number of the failed verification times and determines whether the number of failed verification times exceeds a preset number, if yes, the financial card returns information that the fingerprint verification is failed to the host computer, ends the procedure; otherwise, updates the number of remaining verification times, then continues to execute the Step R02. For example, updating the number of failed verification times is specifically adding 1 to the number of failed verification times; the preset number is 3; updating the number of remaining verification times is: the number of remaining verification times=the preset number−the number of failed verifying times. Further, if the financial card determines that the number of failed verifying times does not exceed the preset number, the method further includes: the financial card displays the number of remaining verification times.

Optionally, the method further includes: when the financial card determines that the received command is verifying command and the verifying command is offline verifying command in Step 202, executes the following steps:

Step R11, the financial card determines whether the offline verifying command includes the offline verification code, if yes, executes Step R12; otherwise, executes Step R13;

For example, if the offline verifying command received by the financial card is 00 20 01 00 02 12 34, executes the Step R12; the data of the first byte and the second byte of the command, i.e. 00 20, is taken as identification of the verifying command; the data of the third byte of the command, i.e. 01, is taken as the identification indicating that the fingerprint input by the user need to be verified, the data of the third byte of the obtained command, i.e. 00 20, is taken as the identification of the verifying command, the data of the fifth byte of the obtained command, i.e. 02, is taken as length of verification code, the data of the sixth byte and the seventh byte of the obtained command, i.e. 12 34, is taken as verification code; if the offline verifying command received by the financial card is 00 20 00 00 02 00 00, executes the Step R13; the data of the first byte and the second byte of the obtained command, i.e. 00 20, is taken as identification of verify command; the data of the fifth byte of the obtained command, i.e. 02, is taken as length of verification code, the data of the sixth byte and the seventh byte of the obtained command, i.e. 00 00, is taken as identification indicating that the fingerprint input by the user need to be verified.

Step R12, the financial card obtains offline verification code from the offline verifying command, verifies the obtained offline verification code according to self-stored offline verification code, if the verification is successful, the financial card returns information that offline verification is successful to the host computer, otherwise, the financial card returns information that offline verification is failed to the host computer.

For example, the financial card takes the data of the sixth byte to the seventh byte, i.e. 12 34, of the offline verifying command 00 20 00 00 02 12 34 as the offline verification code, compares the taken offline verification code 12 34 with self-stored offline verification code 12 34, if they are consistent, the financial card returns information that offline verification is successful to the host computer.

Step R13, the financial card waits for the user to input fingerprint, if the fingerprint input by the user is obtained, the financial card verifies the fingerprint input by the user according to self-stored user registration fingerprint, if the verification is successful, the financial card returns information that offline verification is successful to the host computer, otherwise, the financial card returns information that offline verification is failed to the host computer.

In the present embodiment, the financial card generates application cryptogram may be specifically: the financial card generates application cryptogram according to the information that offline fingerprint verification is successful or the information that offline fingerprint verification is failed.

In the present embodiment, when the financial card waits for the user to input fingerprint, the method further includes that the financial card prompts the user to input fingerprint.

Specifically, the financial card prompts the user to input fingerprint is specifically: the financial card prompts the user to input fingerprint via a display screen, an indicator light or voice.

In the present disclosure, the method further includes an operation of entering a fingerprint on the financial card. In the present embodiment, the operation of entering a fingerprint on the financial card is identical to that of Embodiment 2. No more detail is given here.

Optionally, in the method of the present embodiment, the financial card executes data communication with the host computer via Bluetooth; the financial card may also execute data communication with the host computer via contact way or contactless way.

Optionally, in the present embodiment, after the financial card executes each step of the Step 203 to the Step 210, the method further includes that the financial card executes operating of the Step 201.

In the present disclosure, the manner in which the financial card prompts the user may be one or more of the display, sound, and indicator light. For example, when the financial card prompts the user to input a fingerprint, the financial card prompts by voice and/or display a prompt: "Please enter a fingerprint".

Embodiment 4

Figure 3:
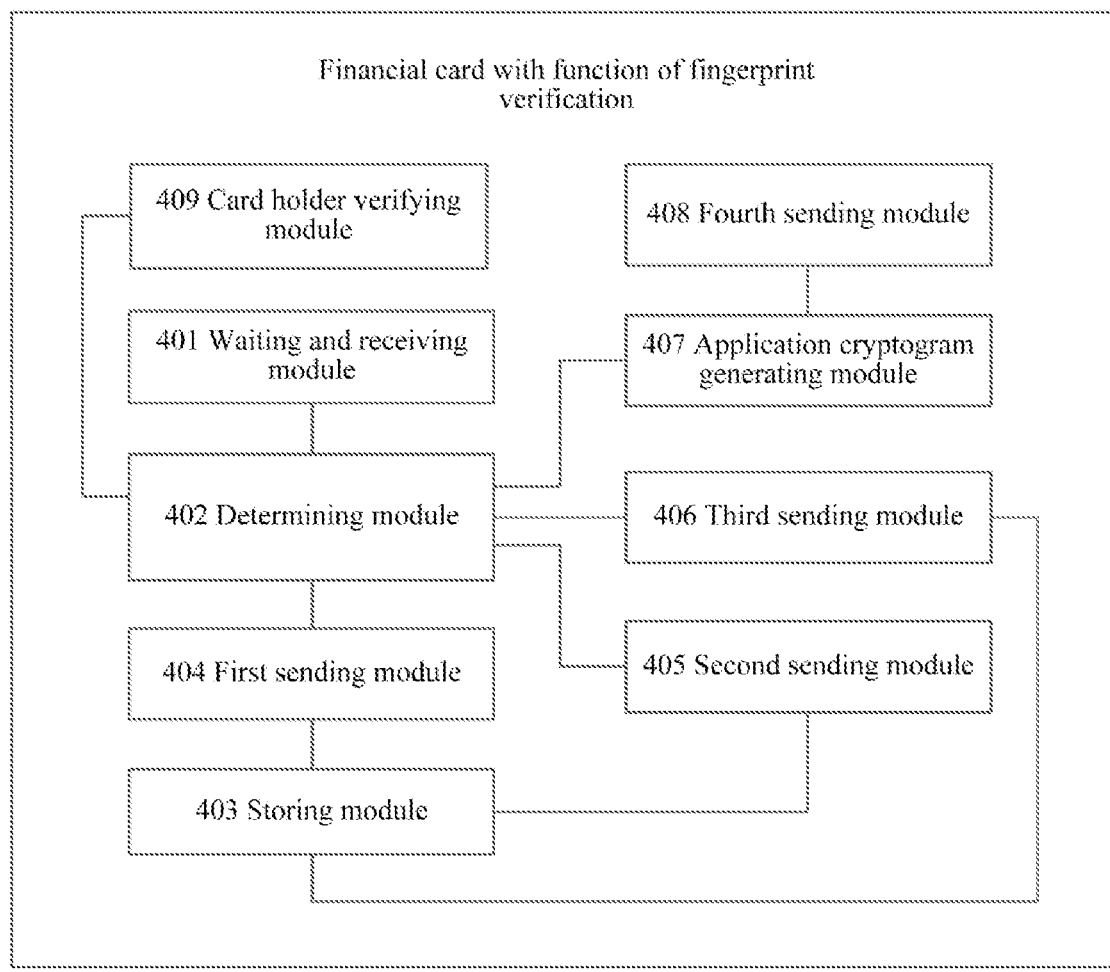
FIG. 3 is a block diagram for modules of a financial card with function of fingerprint verification in Embodiment 4 of the present disclosure.

The present embodiment provides a financial card with function of fingerprint verification. As shown by FIG. 3, the financial card includes:

a waiting and receiving module 401, configured to wait to receive a command from a host computer;

a determining module 402, configured to determine a type of the command when the command from the host computer is received by the waiting and receiving module 401;

a storing module 403, configured to store application information supported by the financial card, to store file information and to store application data;

a first sending module 404, configured to send the application information supported by the financial card which is stored by the storing module 403 to the host computer when the determining module 402 determines that the command received by the waiting and receiving module 401 is an application selecting command;

a second sending module 405, configured to send the file information stored by the storing module 403 to the host computer when the determining module 402 determines that the type of the command received by the waiting and receiving module 401 is a processing option acquiring command;

a third sending module 406, configured to send the application data corresponding to a file identification in an application data reading command which is stored by the storing module 403 to the host computer when the determining module 402 determines that the type of the command received by the waiting and receiving module 401 is the application data reading command;

an application cryptogram generating module 407, configured to execute card behavior analysis and generate application cryptogram if the determining module 402 determines that the type of the command received by the waiting and receiving module 401 is an application cryptogram acquiring command;

a fourth sending module 408, configured to send the application cryptogram generated by the application cryptogram generating module 407 to the host computer;

The financial card further includes: a card holder verifying module 409 and/or a boot-up verifying module;

the card holder verifying module 409 is configured to, if the determining module 402 determines that the type of the received command received by the waiting and receiving module 401 is a verifying command and the verifying command is specifically a fingerprint verifying command, execute card holder verification according to a fingerprint of a user and return information related to the card holder verification to the host computer;

a storing module 403 is further configured to store user registration fingerprint;

the boot-up verifying module is configured to, if a boot-up event is received, execute boot-up verification according to the user registration fingerprint stored by the storing module 403 and a fingerprint input by a user;

when the boot-up verifying module is comprised in the financial card, the waiting and receiving module 401 is specifically configured to wait to receive the command from the host computer after the verification executed by the boot-up verifying module is successful.

In the present embodiment, if the fingerprint verifying command received by the waiting and receiving module 401 is specifically online fingerprint verifying command, the card holder verifying module 409 is specifically configured to, when the determining module 402 determines that the type of the received command is a verifying command and the verifying command is specifically fingerprint verifying command, wait for the user to input fingerprint; when the fingerprint input by the user is obtained, the card holder verifying module 409 is configured to compute online fingerprint feature according to the obtained fingerprint and sends the online fingerprint feature to the host computer.

In the present embodiment, the storing module 403 is further configured to store an online verification code;

Correspondingly, if the determining module 402 determines that the command received by the waiting and receiving module 401 is a verifying command and the verifying command is specifically online verifying command, the card holder verifying module 409 is further configured to wait for the user to input a fingerprint, verify the fingerprint input by the user according to the user registration fingerprint stored by the storing module 403 if the fingerprint input by the user is obtained, and return a self-stored online verification code stored by the storing module 403 to the host computer if the verification is successful, otherwise, return information that the verification is failed to the host computer.

In the present embodiment, the fingerprint verifying command received by the waiting and receiving module 401 is specifically offline fingerprint verifying command; the card holder verifying module 409 is specifically configured to, when the determining module 402 determines that the command received by the receiving module 401 is a verifying command and the verifying command is an offline fingerprint verifying command, wait for the user to input fingerprint and verify the fingerprint input by the user according to the user registration fingerprint stored by the storing module 403 when the fingerprint input by the user is received, return information that the offline fingerprint verification is successful to the host computer if the verification is successful, otherwise, return information that the offline fingerprint verification is failed to the host computer.

In the present embodiment, the storing module 403 is further configured to store the offline verification code.

Correspondingly, the card holder verifying module 409 is further configured to, when the determining module 402 determines that the command received by the waiting and receiving module 401 is a verifying command and the verifying command is specifically the offline verification code verifying command, verify the offline verification code input by the user according to the offline verification code stored by the storing module 403, return information that the offline verification is successful to the host computer if the verification is successful; otherwise, return information that the offline verification is failed to the host computer.

Or, the card holder verifying module 409 is further configured to, when the determining module 402 determines that the command received by the waiting and receiving module 401 is a verifying command and the verifying command is an offline verification code verifying command, obtain offline verification code from the offline verification code verifying command, verify the obtained offline verification code according to the offline verification code stored by the storing module 403, return information that the offline verification is successful to the host computer if verifying is successful; otherwise, return information that the offline verification is failed.

Or, the card holder verifying module 409 includes a first determining sub-module, a first verifying sub-module, a second verifying sub-module and a first sending sub-module;

the first determining sub-module is configured to, when the determining module 402 determines that the command received by the waiting and receiving module 401 is a verifying command and the verifying command is an offline verifying command, determine whether the offline verifying command includes offline verification code;

the first verifying sub-module is configured to, when the first sub-determining module determines that the offline verifying command includes offline verification code, obtain offline verification code from the offline verifying command and verify the obtained offline verification code according to the offline verification code stored by the storing module 403;

the first sending sub-module is configured to return information that the offline verification is failed to the host computer when the verification of the first verifying sub-module is failed;

the second verifying sub-module is configured to wait for the user to input fingerprint when the verification of the first verifying sub-module is successful, verify the fingerprint input by the user according to the user registration fingerprint stored by the storing module 403; the second verifying sub-module is further configured to wait for the user to input the fingerprint when the first determining sub-module determines that the offline verifying command does not include the offline verification code, verify the fingerprint input by the user according to the user registered fingerprint stored by the storing module 403 when the fingerprint input by the user is received;

The first sending sub-module is further configured to return information that the offline fingerprint verification is successful to the host computer if the verification of the second verifying sub-module is successful, and return information that the offline fingerprint verification is failed to the host computer if the verification of the second verifying sub-module is failed.

Or, the card holder verifying module 409 includes a second determining sub-module, a third verifying sub-module, a fourth verifying sub-module and a second sending sub-module;

the second determining sub-module is configured to, when the determining module 402 determines that the command received by the waiting and receiving module 401 is a verifying command and the verifying command is specifically an offline verifying command, determine whether the offline verifying command includes offline verification code;

the third verifying sub-module is configured to, when the second determining sub-module determines that the offline verifying command includes an offline verification code, obtain the offline verification code from the offline verification code, verify the obtained offline verification code according to the offline verification code stored by the storing module 403;

the second sending sub-module is configured to return information that the offline fingerprint verification is successful to the host computer when the verification of the third verifying sub-module is successful, return information that the offline fingerprint verification is failed to the host computer when the verification of the third verifying sub-module is failed;

the fourth verifying sub-module is configured to wait for the user to input fingerprint when the second determining sub-module determines that the offline verification command does not include the offline verification code, and verify the fingerprint input by the user according to the user registration fingerprint stored by the storing module 403 when the fingerprint input by the user is obtained;

the second sending sub-module is configured to return information that the offline verification is successful to the host computer when the verifying result of the fourth verifying sub-module is successful, and return information that the offline verification is failed to the host computer when the verifying result of the fourth verifying sub-module is failed.

In the present embodiment, the financial card further includes a transaction verifying module;

the transaction verifying module is configured to prompt the user to input transaction verifying information when the determining module 402 determines that the command received by the waiting and receiving module 401 is a transaction verifying command, verify the transaction verifying information input by the user after the transaction verifying information input by the user is received, return information that the verification is successful to the host computer if the verification is successful, otherwise, return information that the verification is failed to the host computer, and end the transaction.

Specifically, the transaction verifying module includes: a first prompting sub-module, a first receiving sub-module, a first fingerprint verifying sub-module, and a first generating and sending sub-module;

the first prompting sub-module is configured to prompt the user to input fingerprint when the determining module 402 determines that the command received by the waiting and receiving module 401 is a transaction verifying command;

the first receiving sub-module is configured to receive the fingerprint input by the user;

the first fingerprint sub-verifying module is configured to verify the fingerprint input by the user according to the user registered fingerprint stored by the storing module 403;

the first generating and sending sub-module is configured to generate the information that the verification is successful when the verification of the first fingerprint verifying sub-module is successful, and returns the information that the verification is successful to the host computer, generate the information that the verification is failed when the verification of the first fingerprint verifying sub-module is failed, and returns the information that the verification is failed to the host computer and end the transaction.

Optionally, the transaction verifying module further includes a storing sub-module;

the first fingerprint verifying sub-module is specifically configured to compute fingerprint feature according to the fingerprint input by the user, determine whether the computed fingerprint feature is consistent with the fingerprint feature of the user registration fingerprint stored by the storing module 403, if yes, the verification is successful; otherwise, the verification is failed;

the storing sub-module is configured to store the fingerprint feature computed according to the fingerprint input by the user when the verification of the fingerprint verifying sub-module is successful.

Correspondingly, the fingerprint verifying command received by the waiting and receiving module 401 is specifically online fingerprint verifying command; the card holder fingerprint verifying module 409 is specifically configured to, when the determining module 402 determines that the command received by the waiting and receiving module 401 is a verifying command and the verifying command is an online fingerprint verifying command, send the computed fingerprint feature which is stored by the storing sub-module to the host computer.

Optionally, the fingerprint verifying command received by the waiting and receiving module 401 is offline fingerprint verifying command; the card holder verifying module 409 is specifically configured to, when the determining module 402 determines that the command received by the receiving module 401 is a verifying command and the verifying command is specifically an offline fingerprint verifying command, generate result of successful offline fingerprint verification according to the information that verifying is successful generated by the first sub-generating and sending module and send the result of successful offline fingerprint verification to the host computer.

Specifically, the transaction verifying module may also specifically include: a second prompting sub-module, a second obtaining sub-module, a second verification code verifying sub-module, and a second generating and sending sub-module;

the second prompting sub-module is configured to, when the determining module 402 determines that the command received by the waiting and receiving module 401 is a verifying command, prompt the user to input the transaction verification code;

the second obtaining sub-module is configured to obtain the verification code input by the user;

the second verification code verifying sub-module is configured to verify the transaction verification code input by the user which is obtained by the second obtaining sub-module according to the transaction verification code stored by the storing module 403;

the second generating and sending sub-module is configured to generate information that the verification is successful and return the information that the verification is successful to the host computer when the verification of the second verification code verifying sub-module is successful, generate information that the verification is failed and return the information that the verification is failed to the host computer when the verification of the second verification code verifying sub-module is failed, and end the transaction;

or, the transaction verifying module specifically includes: a second obtaining sub-module, a second verification code verifying sub-module, a second generating and sending sub-module;

the second obtaining sub-module is configured to obtain a transaction verification code from the transaction verifying command;

the second verification code verifying sub-module is configured to verify the transaction verification code obtained from the transaction verifying command by the second obtaining sub-module, according to the transaction verification code stored by the storing module 403;

the second generating and sending sub-module is configured to generate information that the verification is successful when the verification of the second verification code verifying sub-module is successful and return information that the verification is successful to the host computer, generate information that the verification is failed when the verification of the second verification code verifying sub-module is failed, return information that the verification is failed to the host computer and end the transaction;

Optionally, the card holder verifying module 409 is further configured to, when the determining module 402 determines that the command received by the waiting and receiving module 401 is a verifying command and the verifying command is specifically an offline verification code verifying command, generate result of successful offline verification code verification according to the information that the verification is successful generated by the second generating and sending sub-module, and send the result of successful offline verification code verification to the host computer.

In the present embodiment, the boot-up verifying module is specifically configured to prompt the user to input fingerprint when a boot-up event is received, verify the fingerprint input by the user according to the user registration fingerprint stored by the storing module 403 when the fingerprint input by the user is received.

Correspondingly, the waiting and receiving module 401 is specifically configured to wait to receive the command sent from the host computer when the verification of the boot-up verifying module is successful.

In the present embodiment, the boot-up verifying module is specifically configured to compute fingerprint feature according to the fingerprint input by the user when the boot-up event is received, determine whether the computed fingerprint feature is consistent with the fingerprint feature of the user registration fingerprint stored by the storing module 403; if yes, the verification is successful; otherwise, the verification is not failed.

the boot-up verifying module is further configured to store the computed fingerprint when the verification is successful.

Correspondingly, the fingerprint verifying command received by the waiting and receiving module 401 is specifically an online fingerprint verifying command; the cardholder verifying module 409 is specifically configured to, when the determining module 402 determines that the command received by the waiting and receiving module 401 is a verifying command and the verifying command is specifically an online fingerprint verifying command, send the fingerprint feature stored by the boot-up verifying module to the host computer.

In the present embodiment, the boot-up verifying module is further configured to store the result of successful verification.

Correspondingly, the fingerprint verifying command received by the waiting and receiving module 401 is specifically an offline fingerprint verifying command; the card holder module 409 is specifically configured to, when the determining module 402 determines that the command received by the waiting and receiving module 401 is a verifying command and the verifying command is specifically an offline fingerprint verifying command, generate information that the offline fingerprint verification is successful according to the result of successful verification stored by the boot-up verifying module and send the information that the offline fingerprint verification is successful.

In the present embodiment, the application cryptogram generating module 407 is specifically configured to generate application cryptogram according to the information that the offline fingerprint verification is successful or the information that the offline fingerprint verification is failed generated by the card holder verifying module 409.

In the present embodiment, when the financial card includes the boot-up verifying module, and the verification of the boot-up verifying module is successful, the storing module 403 is specifically configured to store the application information supported by the financial card, store file information of record information related to the online verification code, store the application data including the online verification code and store the user registration fingerprint.

In the present embodiment, the boot-up verifying module is specifically configured to compute fingerprint feature according to the fingerprint input by the user, determine whether the computed fingerprint is consistent with the fingerprint feature of the user registration fingerprint stored by the storing module 403, if yes, the verification is successful; otherwise, the verification is failed;

when the verification of the boot-up verifying module is successful, the storing module 403 is specifically configured to store the application information supported by the financial card, store the file information of the record information related to the fingerprint feature computed by the boot-up verifying module, store the application data of the fingerprint feature computed by the boot-up verifying module and store the user fingerprint registered fingerprint.

Optionally, the fingerprint verifying command received by the waiting and receiving module 401 is an offline fingerprint verifying command; correspondingly, the card holder verifying module 409 is specifically configured to wait for the user to input fingerprint when the determining module 402 determines that the command received by the waiting and receiving module 401 is a verifying command and the verifying command is specifically an offline fingerprint verifying command, verify the fingerprint input by the user according to the user registration fingerprint stored by the storing module 403 when the fingerprint input by the user is received, return information that the offline fingerprint verification is successful to the host computer if the verification is successful, otherwise, return information that the offline fingerprint verification is failed to the host computer.

In the present embodiment, the boot-up verifying module is specifically configured to execute the boot-up verification according to the user registration fingerprint stored by the storing module and the fingerprint input by the user when the financial card being powered up or the boot-up event from the user is received.

Optionally, the financial card further includes a Bluetooth module;

the Bluetooth module is configured to communicate with data the host computer via Bluetooth;

Correspondingly, the waiting and receiving module waits to receive a command from the host computer via the Bluetooth module;

The first sending module 404, the second sending module 405, the third sending module 406 and the fourth sending module 408 send data via the Bluetooth module.

The described embodiments are only specific embodiments of the present disclosure, but are not to be construed as limiting the scope of the disclosure. The variations or substitution easily obtained by those skilled in the art within the scope disclosed by the present disclosure should be within the scope of the present disclosure. Therefore, the scope of the present disclosure should be determined by the scope of the appended claims.

What is claimed is:

1. A working method for a financial card with function of fingerprint verification, comprising:
   Step S1, receiving, by the financial card, at least one command from a host computer;
   Step S2, determining, by the financial card, a type of one of the at least one command is a verifying command and the verifying command is specifically a fingerprint verifying command;
   executing, by the financial card, card holder verification according to a fingerprint of a user;
   and returning, by the financial card, information related to the card holder verification to the host computer, wherein the financial card comprises a fingerprint collector and a power key;
   and, before the Step S2, the method further comprises:
   receiving, by the financial card, a boot-up event, wherein the receiving, by the financial card, the boot-up event comprises: the financial card being powered up, or the power key being pressed by the user;
   executing, by the financial card, boot-up verification according to a self-stored user registration fingerprint and a fingerprint input by a user, wherein the fingerprint input by the user is obtained from the fingerprint collector,
   executing the Step S2 when the boot-up verification is successful;
   and when the boot-up verification is successful, the Step S2 further comprises:
   determining, by the financial card, the type of one of the at one command further comprises: a processing option acquiring command and an application data reading command;
   when the financial card determines the type of one of the at least one command is the processing option acquiring command, Step S4, sending, by the financial card, file information comprising record information related to a self-stored online verification code to the host computer, wherein the record information related to the self-stored online verification code comprises a short file identification of a file where the self-stored online verification code is located and a corresponding record number; and
   when the financial card determines the type of one of the at least one command is the application data reading command, Step S5, sending, by the financial card, application data comprising the self-stored online verification code corresponding to the record information of the self-stored online verification code to the host computer.

2. The method of claim 1, wherein the executing, by the financial card, boot-up verification according to a self-stored user registration fingerprint and a fingerprint input by a user comprises:
   Step H1, prompting, by the financial card, the user to input a fingerprint; and
   Step H2, verifying, by the financial card, the fingerprint input by the user according to the self-stored user registration fingerprint when the financial card obtains the fingerprint input by the user.

3. The method of claim 1, wherein the executing, by the financial card, financial card boot-up verification according to a self-stored user registration fingerprint and a fingerprint input by a user comprises: computing, by the financial card, fingerprint feature according to the fingerprint input by the user, determining whether the computed fingerprint feature is consistent with the fingerprint feature of the self-stored user registration fingerprint, when the computed fingerprint feature is consistent with the fingerprint feature of the self-stored user registration fingerprint, the boot-up verification is successful; otherwise, the boot-up verification is failed;
   when the boot-up verification is successful, the method further comprises: storing, by the financial card, the computed fingerprint feature;
   wherein the fingerprint verifying command is specifically an online fingerprint verifying command;

wherein the executing, by the financial card, card holder verification according to a fingerprint of a user and returning, by the financial card, information related to the card holder verification to the host computer comprises:
sending, by the financial card, the stored computed fingerprint feature to the host computer.

4. The method of claim 1, wherein the financial card executes boot-up verification according to self-stored user registration fingerprint and the fingerprint input by the user, and when the boot-up verification is successful, the method further comprises: storing, by the financial card, a result of successful verification;
wherein the fingerprint verifying command is specifically an offline fingerprint verifying command; and
wherein the executing, by the financial card, card holder verification according to a fingerprint of a user and returning, by the financial card, information related to the card holder verification to the host computer comprises: generating, by the financial card, information that offline fingerprint verification is successful according to the stored result of successful card holder verification and sending the information that the offline fingerprint verification is successful to the host computer.

5. The method of claim 1, wherein the executing, by the financial card, boot-up verification according to a self-stored user registration fingerprint and a fingerprint input by a user comprises: computing, by the financial card, fingerprint feature according to the fingerprint input by the user, determining whether the computed fingerprint feature is consistent with the fingerprint feature of the self-stored user registration fingerprint, when the computed fingerprint feature is consistent with the fingerprint feature of the self-stored user registration fingerprint, the boot-up verification is successful; otherwise, the boot-up verification is failed;
when the boot-up verification is successful, the method further comprises: storing, by the financial card, the computed fingerprint feature;
wherein the file information sent by the financial card to the host computer further comprises recording information of the computed fingerprint feature;
wherein the application data sent by the financial card to the host computer further comprises the computed fingerprint feature corresponding to the recording information of the computed fingerprint feature.

6. The method of claim 1, wherein the fingerprint verifying command is specifically an offline fingerprint verifying command;
wherein the executing, by the financial card, card holder verification according to the fingerprint of the user and returning, by the financial card, information related to the card holder verification to the host computer comprises: obtaining, by the financial card, the fingerprint input by the user; executing, by the financial card, card holder verification on the fingerprint input by the user according to the self-stored user registration fingerprint when the financial card obtains the fingerprint input by the user; when the card holder verification is successful, returning, by the financial card, the information that offline fingerprint verification is successful to the host computer; otherwise, returning, by the financial card, information that the offline fingerprint verification is failed to the host computer.

7. The method of claim 1, wherein the financial card communicates data with the host computer via Bluetooth.

* * * * *